(12) United States Patent
Lee

(10) Patent No.: US 6,723,980 B2
(45) Date of Patent: Apr. 20, 2004

(54) POSITION SENSOR WITH GRATING TO DETECT MOVING OBJECT WITH PERIODIC PATTERN

(75) Inventor: Wai-Hon Lee, 10332 Noel Ave., Cupertino, CA (US) 95014

(73) Assignee: Wai-Hon Lee, Los Altos, CA (US)

(*) Notice: Subject to any disclaimer, the term of this patent is extended or adjusted under 35 U.S.C. 154(b) by 0 days.

(21) Appl. No.: 09/907,322

(22) Filed: Jul. 16, 2001

(65) Prior Publication Data
US 2003/0010906 A1 Jan. 16, 2003

(51) Int. Cl.⁷ .................................................. G01D 5/34
(52) U.S. Cl. ........................... 250/231.16; 250/237 G; 356/616
(58) Field of Search ....................... 250/231.13–231.18, 250/237 R, 237 G; 356/614, 615, 616

(56) References Cited

U.S. PATENT DOCUMENTS

| | | |
|---|---|---|
| 3,973,119 A | 8/1976 | Renes et al. |
| 4,634,853 A | 1/1987 | Kanamaru |
| 4,731,772 A | 3/1988 | Lee |
| 4,757,197 A | 7/1988 | Lee |
| 4,794,585 A | 12/1988 | Lee |
| 4,834,485 A | 5/1989 | Lee |
| 4,843,494 A | 6/1989 | Cronin et al. |
| 4,905,216 A | 2/1990 | Lee |
| 4,906,839 A | 3/1990 | Lee |
| 4,918,675 A | 4/1990 | Lee |
| 4,958,245 A | 9/1990 | Roth et al. |
| 5,001,694 A | 3/1991 | Lee et al. |
| 5,043,775 A | 8/1991 | Lee |
| 5,050,153 A | 9/1991 | Lee |
| 5,064,290 A | * 11/1991 | McMurtry et al. .......... 356/499 |
| 5,136,152 A | 8/1992 | Lee |
| 5,156,999 A | 10/1992 | Lee |

(List continued on next page.)

FOREIGN PATENT DOCUMENTS

| | | |
|---|---|---|
| EP | 0 311 859 A2 | 4/1989 |
| EP | 0 344 759 A2 | 12/1989 |
| EP | 0 546 227 A1 | 6/1993 |
| GB | 2 084 315 A | 4/1982 |
| JP | 56-2247 | 12/1981 |
| JP | 63-100626 | 5/1988 |
| JP | 63-191468 | 12/1988 |
| JP | 1-155580 | 6/1989 |

OTHER PUBLICATIONS

M. Mansuripur, "The Talbot effect", *Optics & Photonics News*, Apr. 1997, pp. 42–47.

O. Bryngdahl and W–H. Lee, "On light distribution in optical waveguides", *J.Opt.Soc.Am.*, vol. 68, No. 3, Mar. 1978, pp. 310–315.

*Primary Examiner*—David Porta
*Assistant Examiner*—Stephen Yam
(74) *Attorney, Agent, or Firm*—Townsend and Townsend and Crew LLP

(57) ABSTRACT

An optical track sensing device, and in particular to an optical sensor for detecting optical tracking information on a moving medium (or stationary medium and moving sensor). The sensing device relies on self-imaging, rather than optics, and obtains a very acceptable detected signal at other than the self imaging plane of the reflection off a moving medium. This provides more flexibility in the placement of the sensor, while still allowing the elimination of optical components by relying on self-imaging instead. In addition, by providing a pattern over the photodetector with a smaller period, higher frequency harmonics are detected, allowing more precise detection of the position of the medium. In one embodiment, the period of the detector pattern is selected to detect the higher harmonics of the grating on the moving medium.

25 Claims, 27 Drawing Sheets

U.S. PATENT DOCUMENTS

| | | |
|---|---|---|
| 5,285,062 A | 2/1994 | Lee |
| 5,311,378 A | 5/1994 | Williams et al. |
| 5,319,507 A | 6/1994 | Umebayashi et al. |
| 5,361,244 A | 11/1994 | Nakamura et al. |
| 5,481,515 A | 1/1996 | Kando et al. |
| 5,619,480 A | 4/1997 | Seo et al. |
| 5,648,951 A | 7/1997 | Kato et al. |
| 5,661,296 A * | 8/1997 | Ishizuka et al. ....... 250/231.14 |
| 5,680,384 A | 10/1997 | Seki et al. |
| 5,889,280 A * | 3/1999 | Matsuura ................ 250/237 G |
| 5,991,249 A | 11/1999 | Lee |
| 6,097,490 A * | 8/2000 | Holzapfel et al. .......... 356/614 |
| 6,400,099 B1 * | 6/2002 | Walker ....................... 315/291 |

* cited by examiner

POSITION SENSOR WITH GRATING TO DETECT MOVING OBJECT WITH PERIODIC PATTERN

BACKGROUND OF THE INVENTION

The present invention relates to an optical track sensing device, and in particular to an optical sensor for detecting optical tracking information on a moving medium.

U.S. Pat. No. 5,991,249 described a method whereby the motion of a moving medium with a grating on its surface can be detected by a sensor consisting of a semiconductor laser and a photodetector. In one example, the moving medium was a floppy disk. This prior art is based on the use of a sinusoidal pattern on the detector to select a particular diffracted wave from the moving grating. By placing the sensor in the self-imaging plane, the need for optical components was reduced. However, in many applications it is necessary to detect the beginning position of the moving grating. In certain applications positional encoding in two dimensions is also required. It is the intention of this application to describe certain improvements to the prior art U.S. Pat. No. 5,991,249, the disclosure of which is incorporated herein by reference.

BRIEF SUMMARY OF THE INVENTION

The present invention reflects the recognition that a very acceptable detected signal can be obtained at other than the self imaging plane of the reflection off a moving medium (or a stationary medium and moving sensor). This provides more flexibility in the placement of the sensor, while still allowing the elimination of optical components by relying on self-imaging instead. In addition, by providing a pattern over the photodetector with a smaller period, higher frequency harmonics are detected, allowing more precise detection of the position of the medium.

In a first embodiment of this invention the period of the detector pattern is selected to detect the higher harmonics of the grating on the medium. Moreover, in this embodiment the placement of the detector can be on planes other than the self-image plane of the grating to increase the resolution in detecting the motion of the grating.

In one version of the first embodiment, the detector contains three light sensitive areas with phase shifts among them for the detection of the motion of a moving medium. This invention recognizes that the differential detection benefit of quadrature signals can be obtained with only three, rather than four, detectors. The invention also applies to a stationary medium, but for simplicity, the discussion herein is directed to the example where the medium moves.

In a second embodiment of the present invention a diffractive cylindrical lens is placed in front of the laser to focus the laser beam to a line on the surface of the moving medium. This line beam is perpendicular to the lines forming the grating. This increases the light collection by the motion detector and reduces noise generated by multiple reflections. In one version of this second embodiment, the period of the detector pattern corresponds to the nth harmonic of the grating. In another variation, the laser beam is focused to a line on the detector. This further improves the light collection at the detector, at the expense of a less sharp image from the medium, which is acceptable in some embodiments.

A third embodiment of the present invention provides for detection of the index marking recorded on the grating. A two element photodetector is used to detect the index. There is no need for a pattern on the photodetector, a simple reflection from the index marking is detected.

A fourth embodiment of this present invention provides an integrated position sensor, which can both detect the motion of the medium and the index marking on the medium. A first laser and detector combination, with a pattern over the detector, detect the motion of the medium by detecting the grating pattern. A second laser and detector combination are mounted offset from the first laser and detector combination, to detect an index marking adjacent the grating on the medium.

A fifth embodiment of the present invention uses a diffracting grating to direct the reflected light to the photodetectors. The grating has the periodic pattern overlayed on it, instead of putting the pattern on the detector itself. This allows the use of a generic detector and reduces the design and manufacturing time for a new pattern. The grating has different periods in different zones, so that the different zones direct the reflected light to different photodetectors.

A sixth embodiment of this invention provides a sensor which can detect motion of a moving medium in two dimensions. Two sets of detector elements are used, each aligned with an axis of one of the two dimensions. Each set of detector elements has its own pattern, corresponding to the grating frequency along its axis on the moving medium. Diffraction gratings can be used to minimize the interference effect of the medium pattern in the other dimension.

DETAILED DESCRIPTION OF THE INVENTION

Basic Principles

Figure 1:
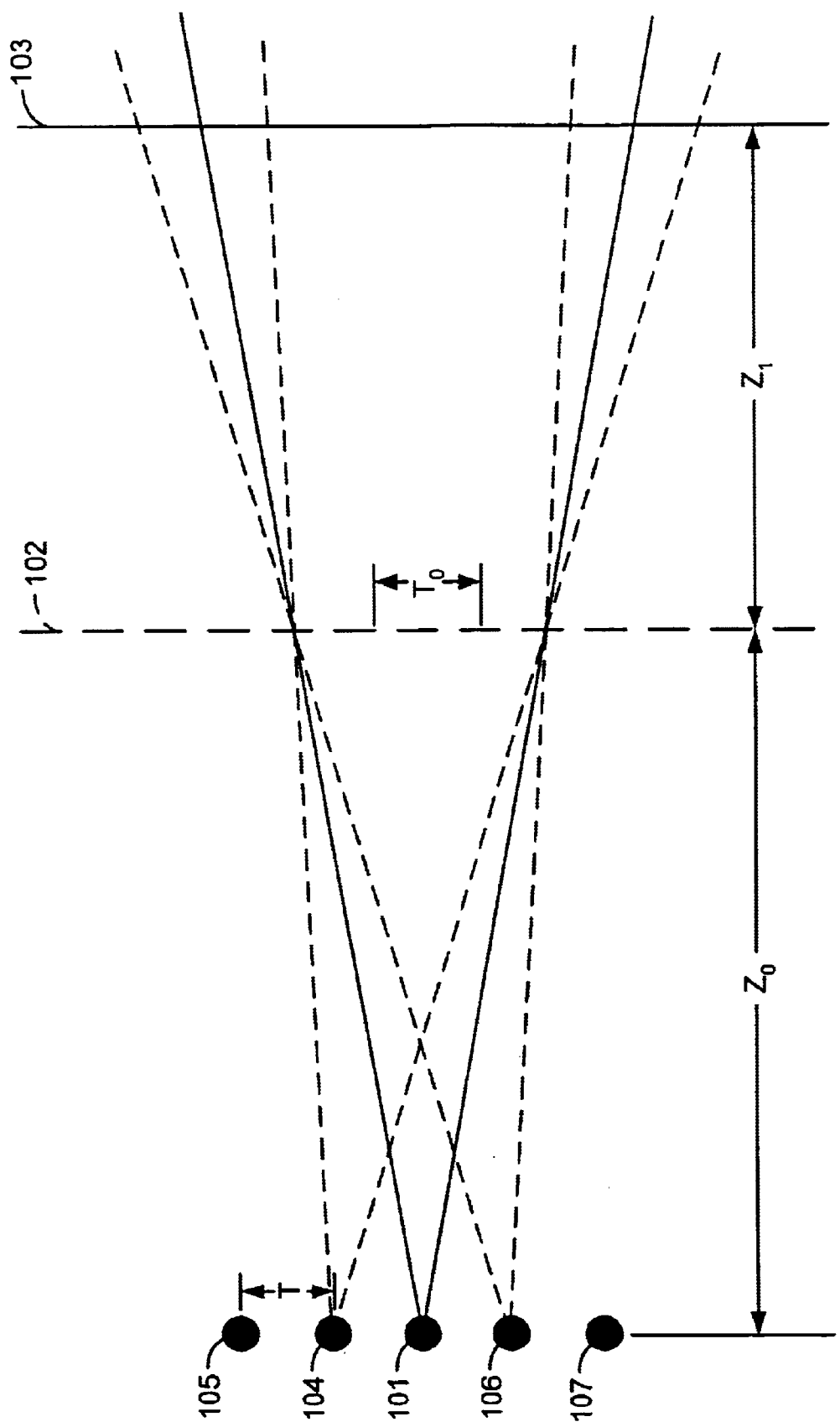
FIG. 1 shows the multiple virtual sources produced by a grating

In FIG. 1 a laser source 101 illuminates a grating 102 with period $T_0$ at a distance $Z_0$ from the laser source 101. The diffracted waves on plane 103 at a distance $Z_1$ from the grating can be perceived as waves emitting from multiple sources as indicated by 104, 105, 106, 107. The separation of these sources is given by $T=Z_0\lambda/T_0$. Hence, the diffracted waves at plane 103 can be written as $$F(x, y) = \sum_n A_n \exp\left\{j\frac{2\pi}{\lambda}\sqrt{(x-nT)^2 + y^2 + Z^2}\right\}, \quad (1)$$

where $j=\sqrt{-1}$, x and y are the spatial coordinates at plane 103 and $Z=Z_0+Z_1$. For x and y much less than Z, the function F(x, y) in Eq. (1) can be approximately written as:

$$F(x, y) \cong \sum A_n \exp\left\{j\frac{\pi}{\lambda Z}[(x-nT)^2 + y^2 + \phi_n]\right\}, \quad (2)$$

where $\phi_n$ is a constant phase. As can be seen, F(x, y) contains signals with spatial frequencies $v=nT/\lambda Z = nZ_0/T_0Z=n/T_0M$, where $M=Z/Z_0$.

For example, the interference between the n=1 and n=−1 terms in Eq. (2) can be written as:

$$S(x, y) = \left|\exp\left\{j\frac{\pi}{\lambda Z}(x-T)^2\right\} + \exp\left\{j\frac{\pi}{\lambda Z}(x+T)^2\right\}\right|^2 \quad (3)$$

In Eq. (3) we assume that $A_{-1}=A_1$ and $\phi_{-1}=\phi_1$. After simplification, S (x, y) becomes $$S(x, y) = \cos\left(2\pi\frac{T}{\lambda Z}x\right) = \cos(2\pi x/MT_0). \quad (4)$$

Since the interference pattern with period $MT_0$ can also be produced by other diffracted orders such as n=0 and n=2, the amplitude of the interference pattern with certain spatial frequency is dependent on the distance $Z_1$ from the grating. The article "The Talbot Effect" by Masud Mansuripur published in Optics and Photonic News (April 1997 Vol. 8 No. 4) explained that the planes located at $Z_1=2kMT_0^2/\lambda$ where k is an integer are optimal for signal detection.

However, as pointed out in the previous discussion, signal detection can take place at planes other than the self image planes defined by the Talbot effect. Therefore, a sinusoidal detector with period $MT_0$ placed at distance $Z_1$ from the grating can generate a sinusoidal signal corresponding to the motion of the grating.

As shown in Eq. (2), the grating, after illumination by the laser beam, produces many diffracted waves. The accuracy in detecting the motion of the grating is dependent on the period of the grating used. The smaller is the period of the grating, the higher is the signal accuracy. It is interesting to note that in using the diffracted waves to detect the motion of a moving grating, the signal accuracy can further be improved by using a detector with period corresponding to a higher order diffracted wave. Although detector with the lowest spatial period $MT_0$ is most commonly used for detecting the motion of grating with period $T_0$, higher order spatial frequency from the moving grating can be detected by using spatial period $MT_0/n$ in the detector structure, where n is the diffracted order.

Figure 2A:
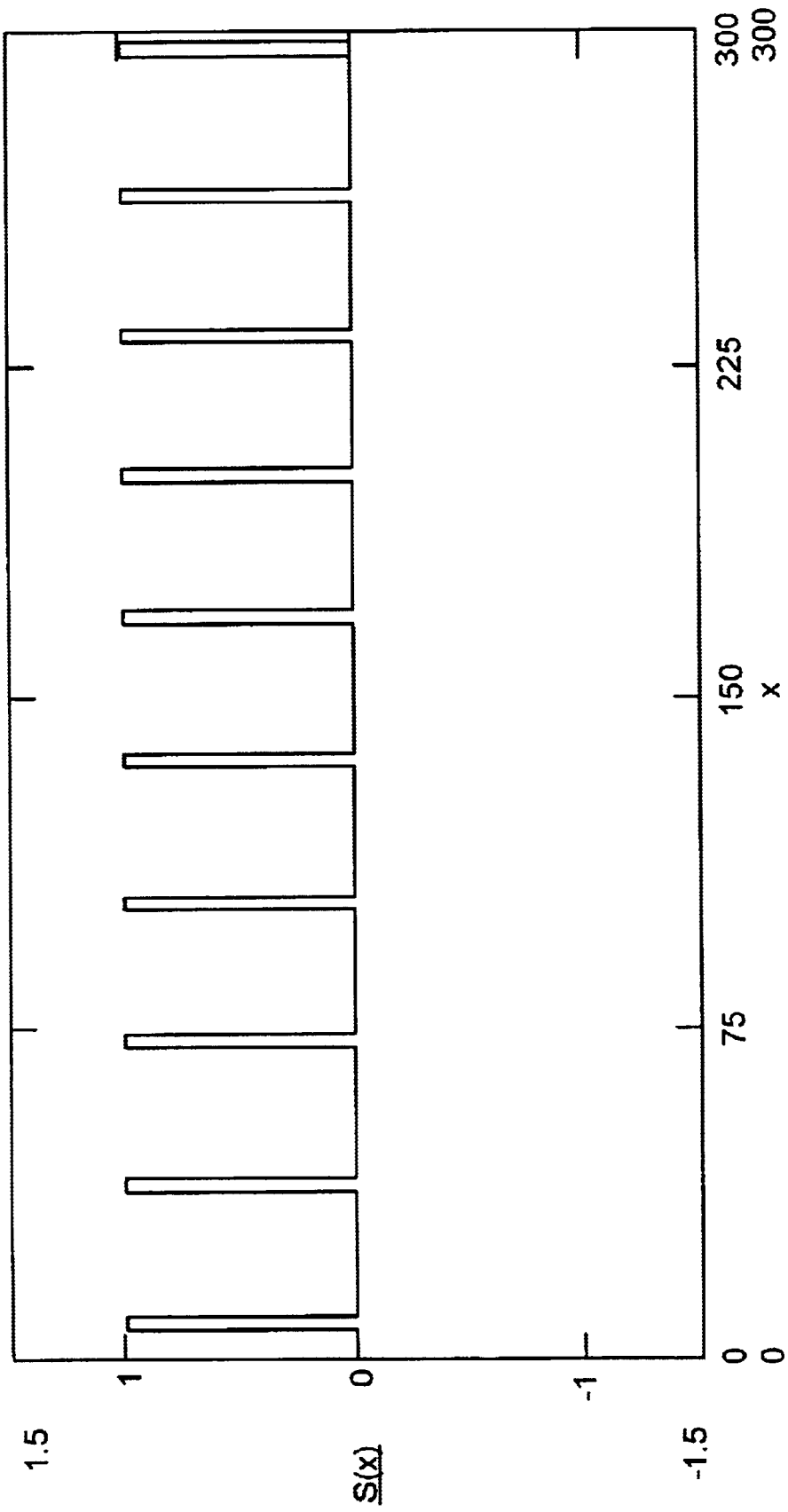
FIG. 2(a) shows a grating profile with uneven mark and space.

FIG. 2(a) shows a grating with uneven mark and space. The ratio of the length of the mark b and the space a is q=a/b. It can be shown that the transmission of the grating can be written as, $$g(x) = \sum_n A_n \cos(2n\pi x/T_0), \quad (5)$$

where $A_n = \dfrac{\sin(n\pi q)}{n\pi}$

Figure 2B:
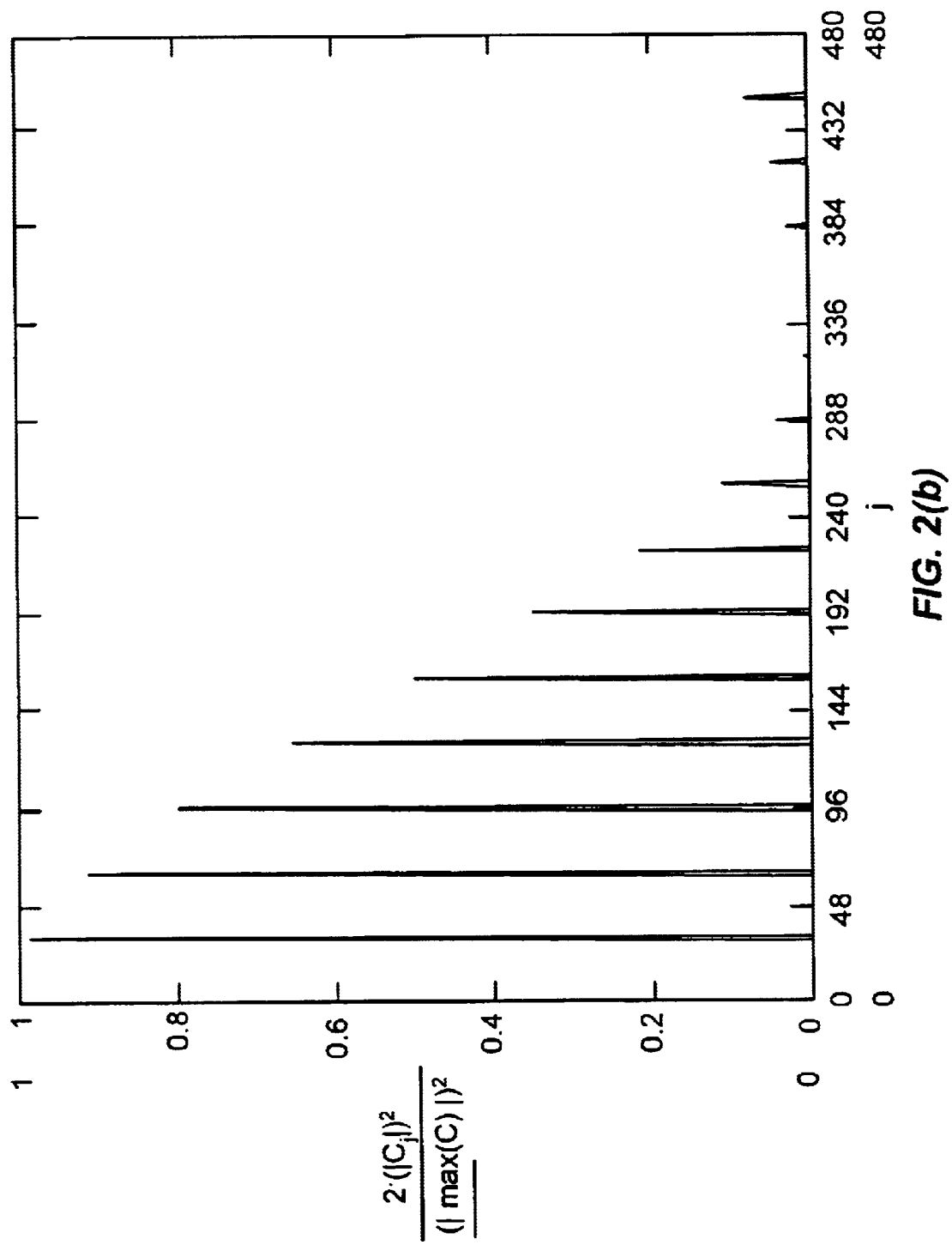
FIG. 2(b) shows the spectrum of the grating profile in (a).

FIG. 2(b) illustrates the harmonic spectrum of a grating with q=10. As can be seen, this grating contains many harmonics. As a result, a detector with period $MT_0/n$, where $M=(Z_1+Z_0)/Z_0$ can pick up the nth harmonic of the grating mounted on the moving medium. Suppose that the period of the moving grating is 20 μm. In the case that $Z_0$ and $Z_1$ are approximately the same the magnification on the detector plane M is approximately equal to 2. To detect this spatial frequency, the sinusoidal pattern on the detector has a period of M·20 μm=40 μm. But, the $4^{th}$ harmonic of this 20 μm grating has a period of 5 μm, which can be detected by using a sinusoidal pattern on the detector with period of 10 μm. This is a 4 fold improvement on the positional accuracy.

Three Detectors Instead of Quadrature Detection

U.S. Pat. No. 5,991,249 showed periodic detectors having a 90 degree phase difference relative to each other. In one of the embodiments in U.S. Pat. No. 5,991,249 the four periodic detectors are shown to have phase delays of 0, 90, 180, and 270 degrees. Quadrature signals with minimal offsets are produced by taking the difference between the 0 degree and 180 degree signals and also the difference between the 90 degree and 270 degree signals. However, it can be shown that differential detection can also be achieved by only three periodic patterns. For example, $$S_1=-\sin(2\pi x/T+2\pi/3)+q,$$

$$M=\sin(2\pi x/T)+q,$$

$$S_2=\sin(2\pi x/T+2\pi/3)+q. \quad (5)$$

The quadrature signals A and B can be generated using the three signals in Eq.(5):

$$A = M - S_1 = \sin(2\pi x/T) + \sin(2\pi x/T + 2\pi/3) = 2\cos(\pi/6)\sin(2\pi x/T + \pi/6), \quad (6)$$

$$B = S_2 - M = \sin(2\pi x/T + 2\pi/3) - \sin(2\pi x/T) = 2\sin(\pi/6)\cos(2\pi x/T + \pi/6). \quad (7)$$

The position of the grating can be determined from $$\phi = 2\pi x/T = \tan^{-1}\left(\frac{A}{B}\tan\left(\frac{\pi}{6}\right)\right) - \frac{\pi}{6}.$$

Therefore, only three detectors with periodic structures are required in the detection of the motion of the grating. Other phase relationship between $S_1$, $M$ and $S_2$ is also possible. For example, when the phase angle $2\pi/6$ in Eq. (5) is replaced by $\pi/2$, $$\phi = 2\pi x/T = \tan^{-1}\left(\frac{A}{B}\right) - \frac{\pi}{4}$$

is even easier to calculate.

Detector Structure

Figure 3A:
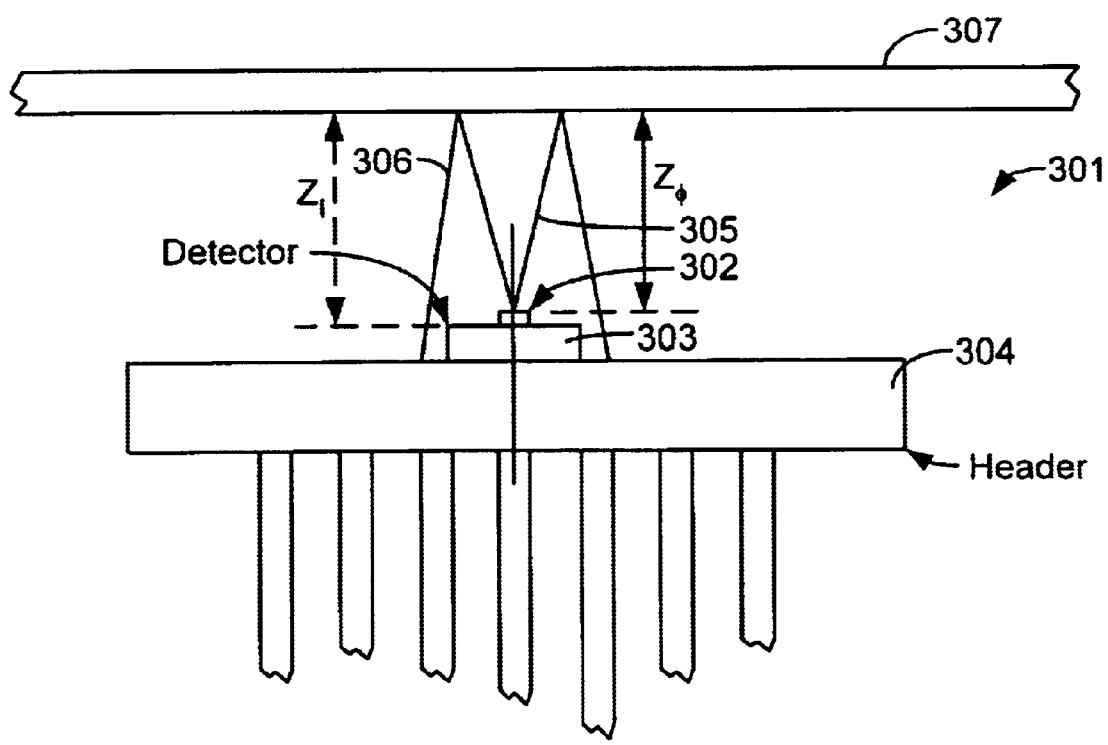
FIG. 3(a) shows the first embodiment of the present invention.

FIG. 3(a) shows the first improvement of the present invention. A vertical cavity surface emitting laser (VCSEL) chip 302 is bonded on top of the detector chip 303. The detector chip 303 is mounted on a header 304 for connecting to the electronic system. The complete device 301 is placed at a distance from the medium 307. The surface of the medium facing the laser contains a periodic grating. Laser 302 emits a diverging cone of light, indicated by line 305. After reflecting back from the medium surface, the reflected beam 306 illuminates the light sensitive elements on the detector. The principle of operation of the device 301 according to U.S. Pat. No. 5,991,249 is based on the fact that diffracted light reflected off the periodic medium can form a Talbot image (or self image) of the grating on the detector surface located at $Z_1 = 2kMT_0^2/\lambda$. However, in this first embodiment of this present invention, the surface of the detector can be placed at a plane other than the self-imaging planes.

Figure 3B:
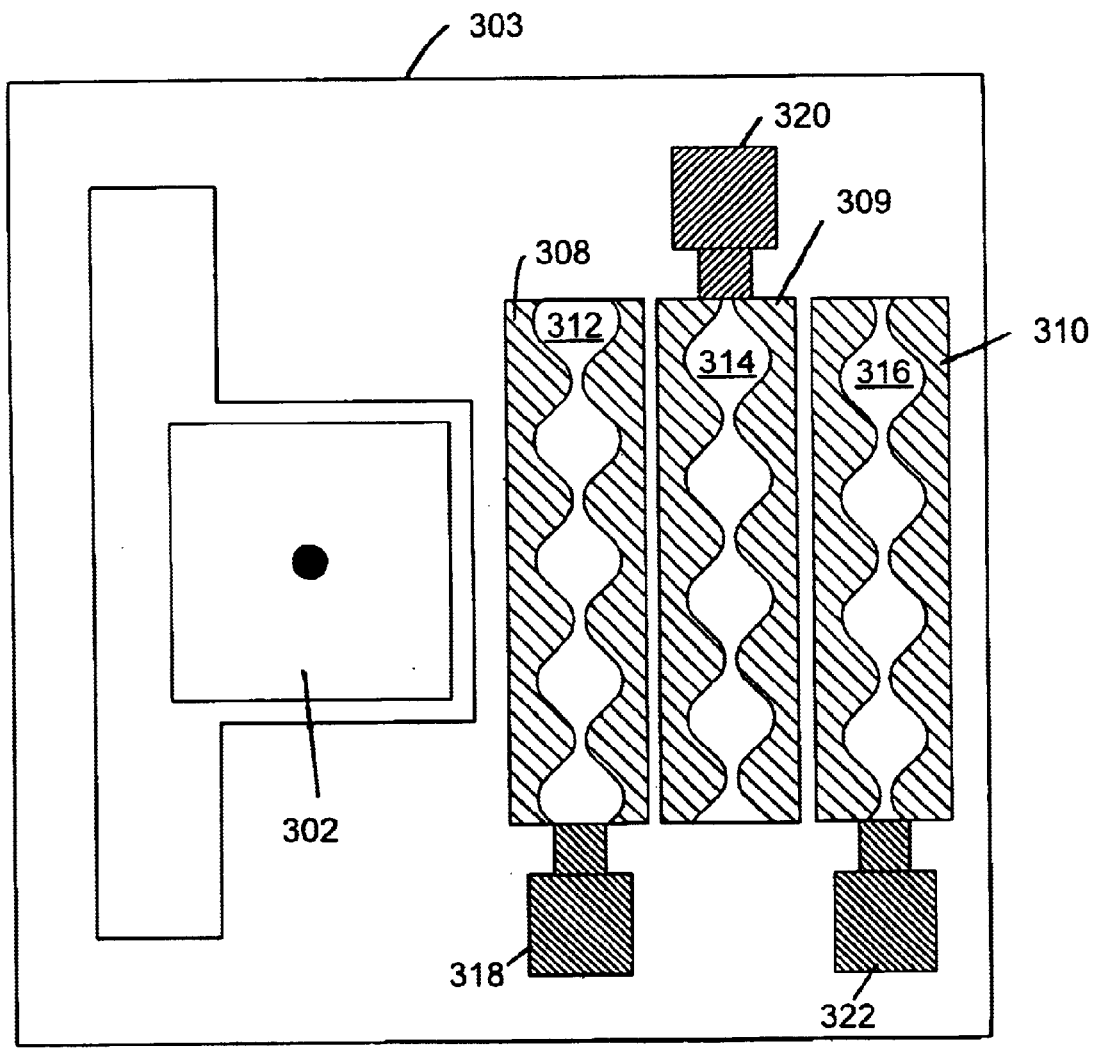
FIG. 3(b) shows the top view of the detector device with the laser chip.

FIG. 3(b) shows the top view of the detector device. Besides the laser 302, three periodic light sensitive patterns 308, 309 and 310 are shown. These patterns overlay the underlying photodetector elements 312, 314 and 316, respectively. The photodetectors are connected to pads 318, 320 and 322, respectively. The periodic patterns in 308 and 309 are 120 degrees out of phase. The periodic patterns in 308 and 310 are 180 degrees out of phase. The phase relationship between these three periodic patterns is defined mathematically by Eq. (5). As pointed out in the previous discussion, it is preferred to make the pattern on the periodic detector to have a period equal to $MT_0/n$, where $M = (Z_1 + Z_0)/Z_0$. This will allow this first embodiment of the present invention to pick up the nth harmonic of the grating mounted on the moving medium to improve on the detection accuracy.

Figure 3C:
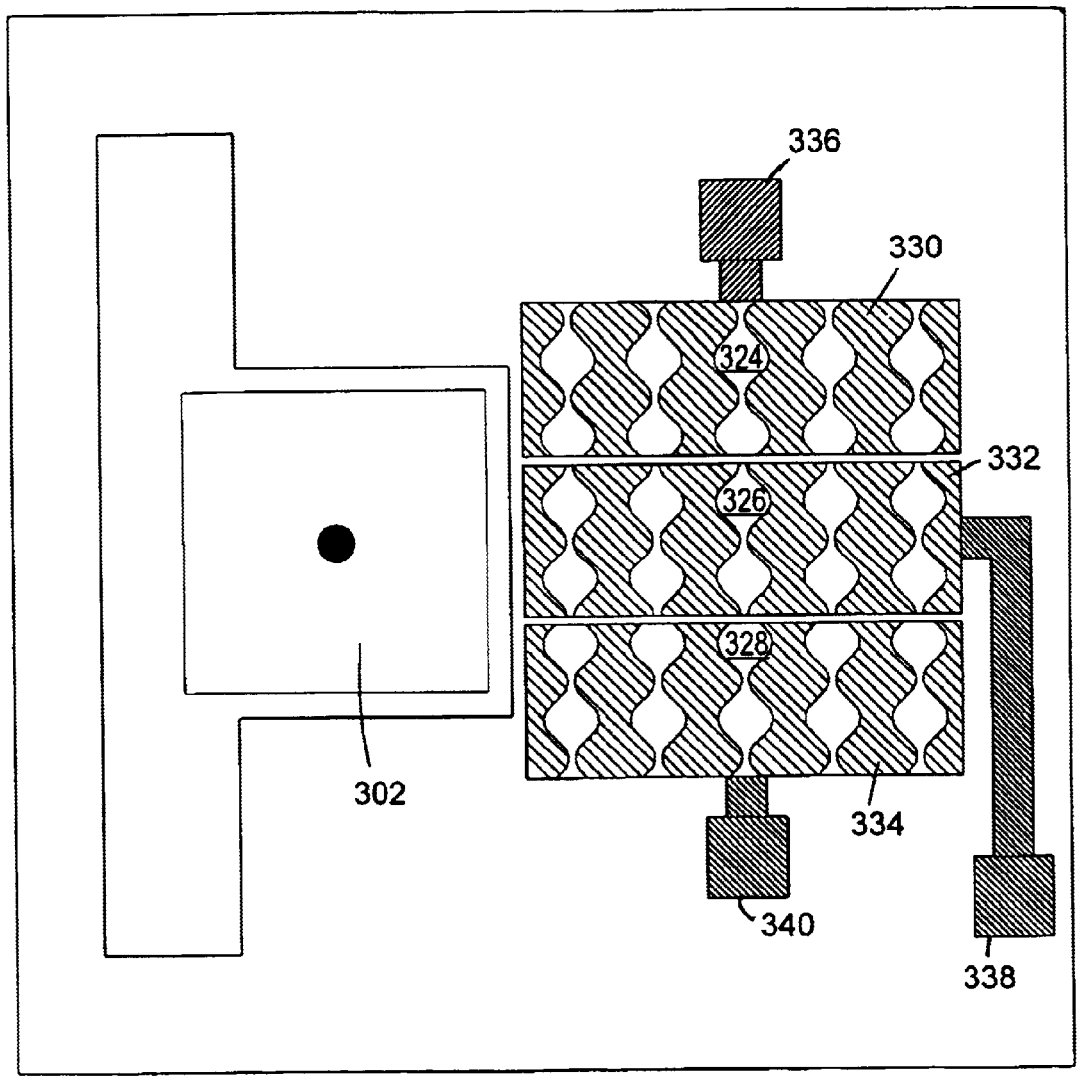
FIG. 3(c) shows the embodiment of FIG. 3(a) with another configuration of the light detectors.

FIG. 3(c) shows another configuration of the light sensitive elements for detecting the diffracted waves. Instead of detectors aligned along the axis of the periodic pattern, the detectors are aligned perpendicular, with each detector crossing under multiple periodic structures. Three detectors, 324, 326 and 328 are arranged horizontally. The periodic structures 330, 332 and 334, which overlay the three detectors, respectively, are similar to the structures in FIG. 3(b), except that multiple, parallel structures are used across each detector, having the same phase. The phase changes in the vertical direction, with the phase changing from structure 330 to structure 334, and then again from structure 334 to structure 336. Bonding pads 336, 338 and 340 connect to detectors 324, 326 and 328, respectively.

Figure 4A:
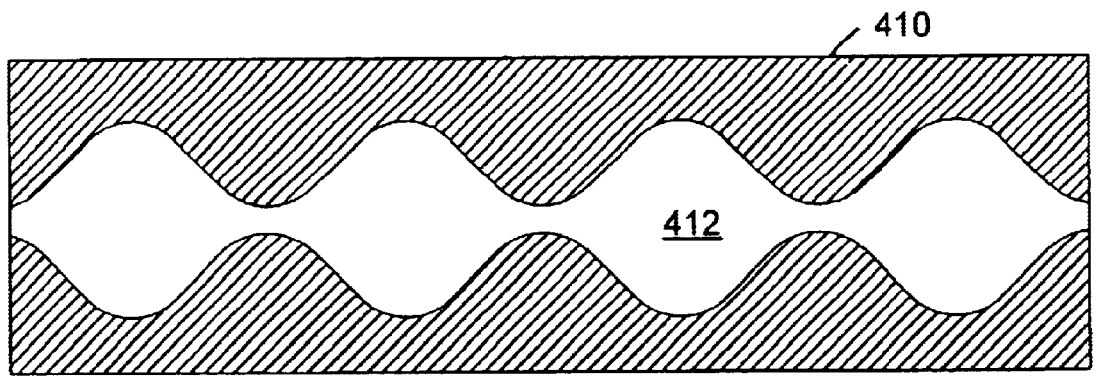
FIGS. 4(a)–(c) show three different kinds of detector patterns.
Figure 4B:
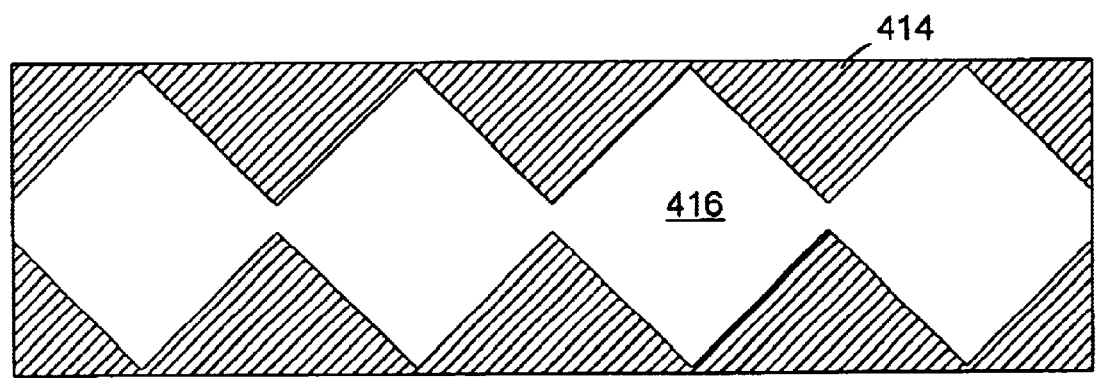
Figure 4C:
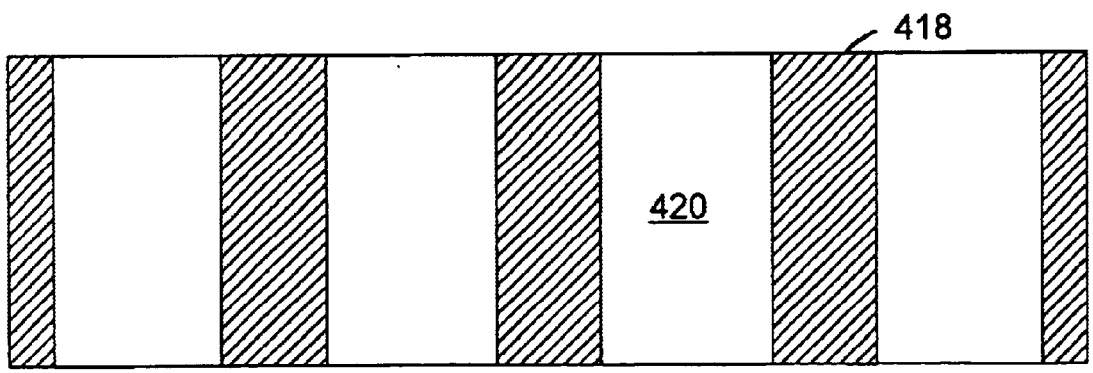

FIGS. 4(a)–(c) show three different periodic patterns which could be used for picking up the motion of the grating. The most preferred pattern is the sinusoidal pattern shown in FIG. 4(a) with a sinusoidal structure 410 overlying detector 412. Alternately, the triangular pattern 414 of FIG. 4(b) could be used over a detector 416, or the rectangular pattern 418 of FIG. 4(c) over a detector 420.

Diffractive Cylindrical Lens

Figure 5A:
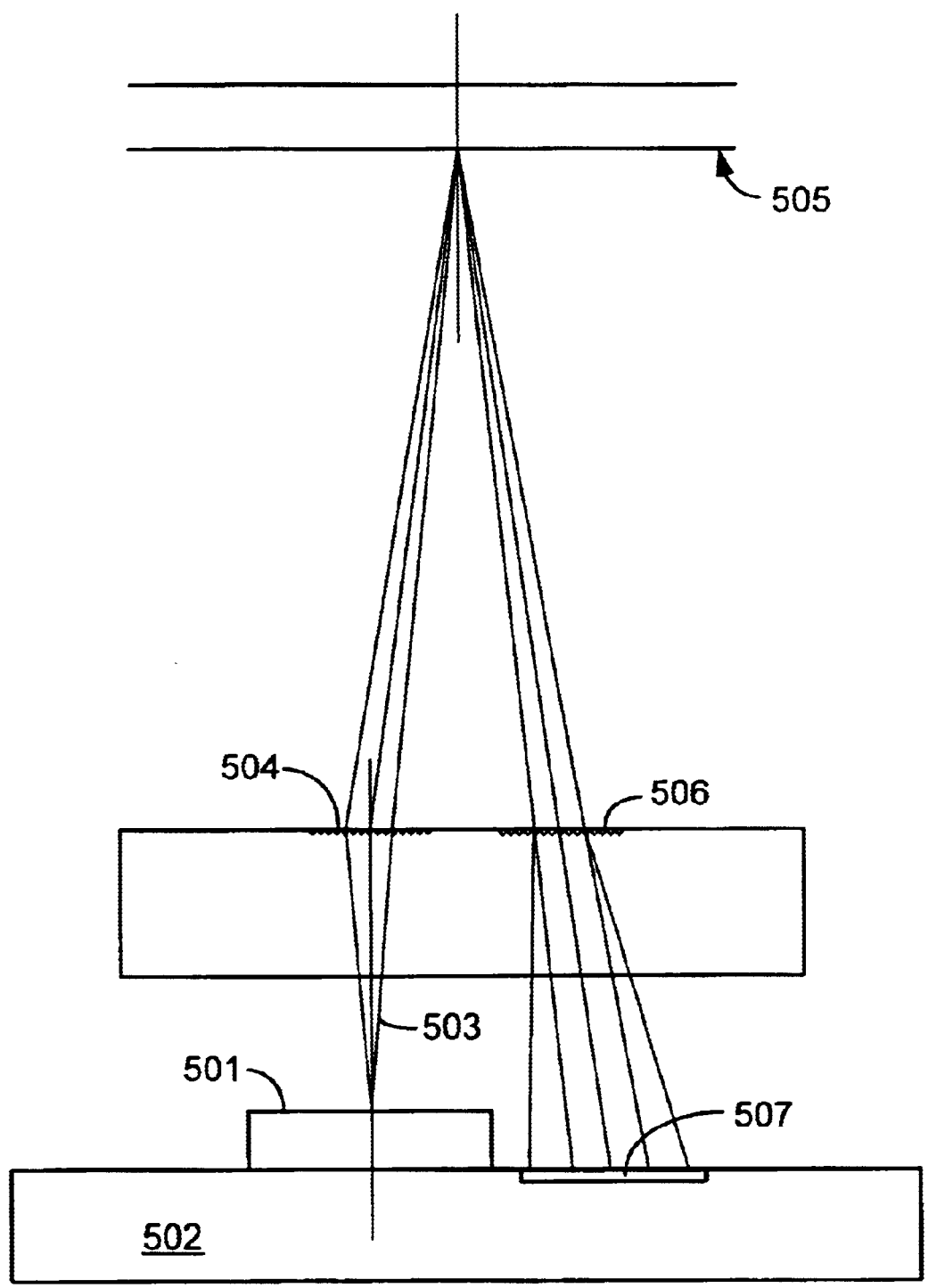
FIG. 5(a) shows an improved device, where diffractive elements focus the laser beam to a line on the motion grating.
Figure 5B:
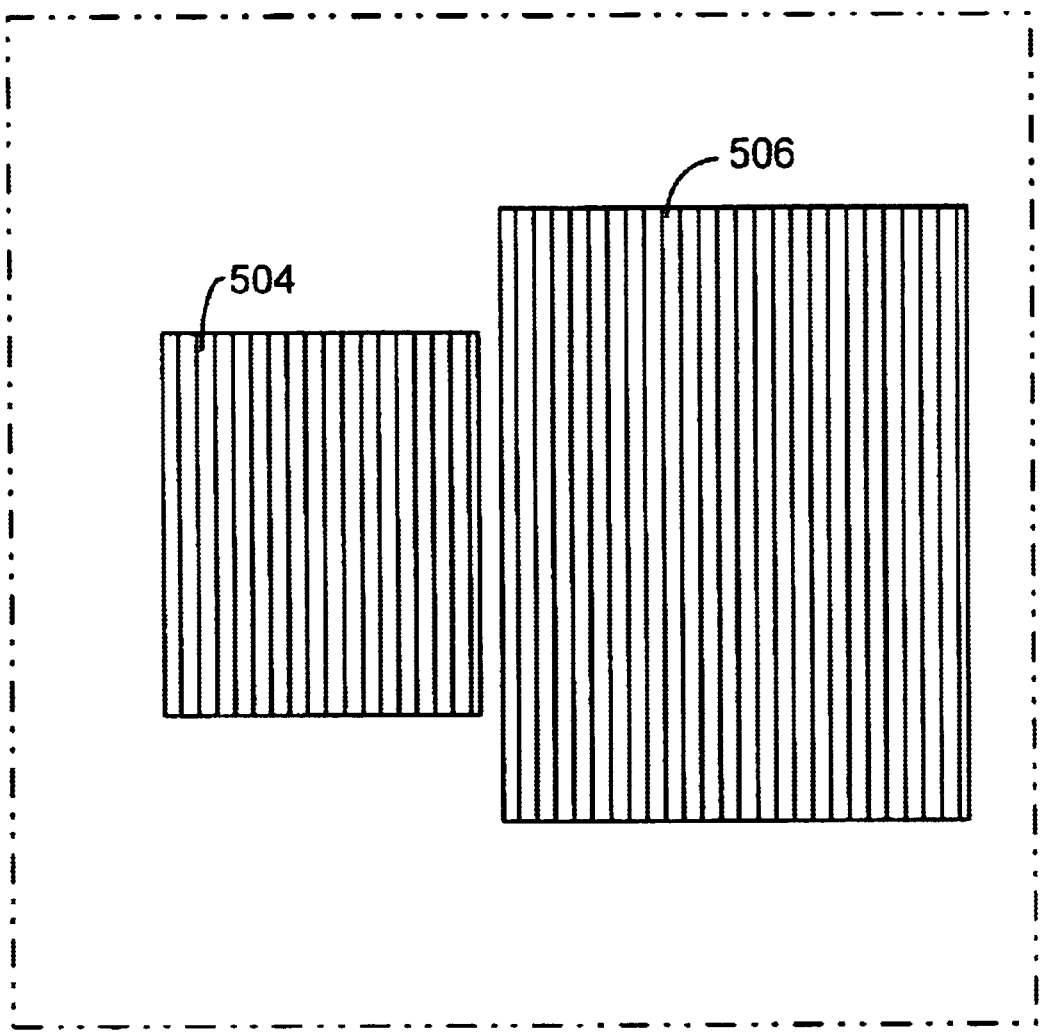
FIG. 5(b) shows the diffractive element put on top of the detector in FIG. 5(a).

In FIG. 3 the light beam reflected back from the medium diverges towards the detector. The area of the light sensitive element on the detector is smaller than the beam on the detector. Therefore, the detector can only collect a relatively small amount of the reflected light. FIG. 5 shows a second preferred embodiment of the present invention, which can improve the light collection of the first embodiment shown in FIG. 3. A laser chip 501 is shown mounted on a detector chip 502. Laser beam 503 from chip 501 is incident on a diffractive cylindrical lens 504. The top view of the grating of diffractive cylindrical lens 504 is shown in FIG. 5(b). The cylindrical lens 504 is different from a spherical lens in that it has focal power only in one dimension. The phase variation on such a diffractive element has the form.

$$\phi(x) = \frac{2\pi}{\lambda F}x^2, \quad (8)$$

where $\lambda$ is the wavelength of the laser and F is the focal length. Due to the diffractive cylindrical lens, beam 503 is focused to a line perpendicular to the plane of the paper on the grating surface 505 of the moving medium. The diverging beam in the direction normal to the plane of the drawing still interacts with the grating to project an interference pattern on the detector. The reflected beam from surface 505 passes through a periodic grating 506 whose function is to spread the light beam more uniformly across the detector 507. The light detecting element 507 is similar to the detector shown in FIG. 3(b) or FIG. 3(c).

Figure 6A:
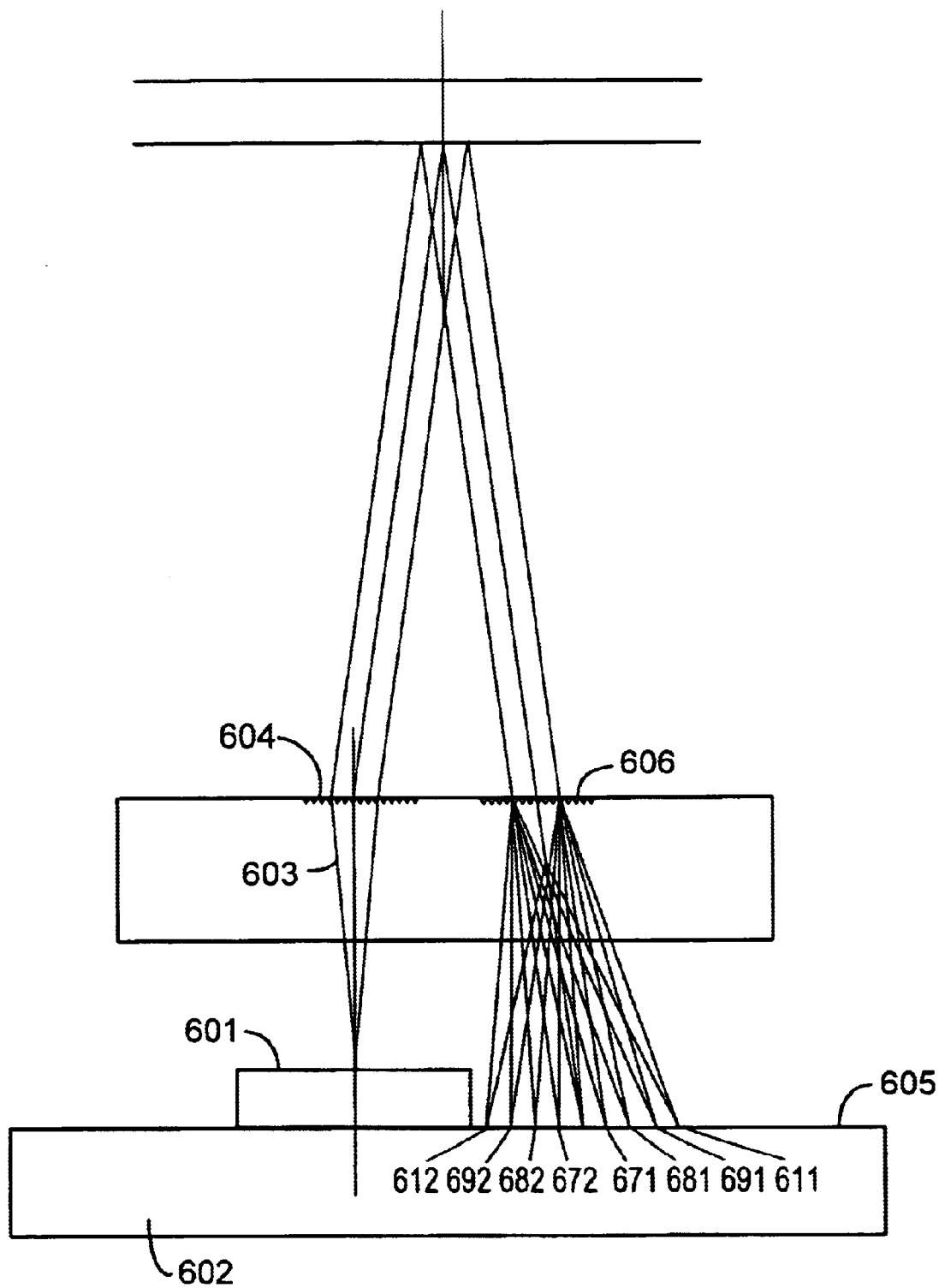
FIG. 6(a) shows an embodiment that uses a grating as the filter.

FIG. 6(a) shows another improvement of this present invention. A laser chip 601 is shown mounted on a detector chip 602. Laser beam 603 from chip 601 is incident on a diffractive cylindrical lens 604, which is similar to the one described the second embodiment of the present invention. However, instead of focusing the light to a line on the medium surface, the diffractive beam from the cylindrical hologram lens is focused on the detector surface 605 as shown in FIG. 6(a). By focussing on the detector surface, the amount of light received by the detector is further improved. The light will not be focussed on the medium, resulting in a less sharp image. However, a tradeoff can be made between the sharpness of the image and the amount of light collected by the detector.

Combined Periodic Structure and Diffraction Lens

Figure 6B:
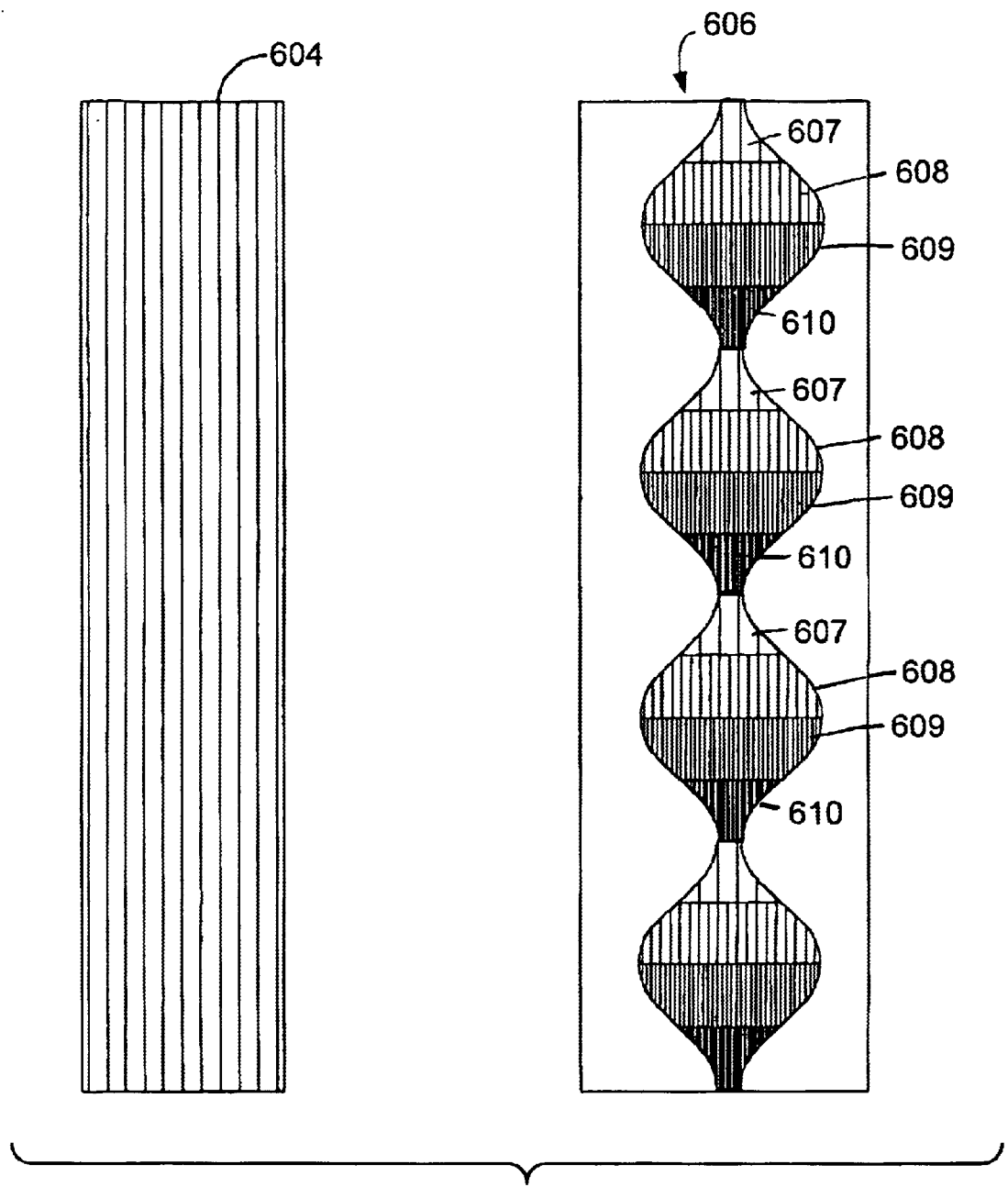
FIG. 6(b) shows one embodiment of a diffractive pattern on the cylindrical lens of FIG. 6(a).
Figure 6C:
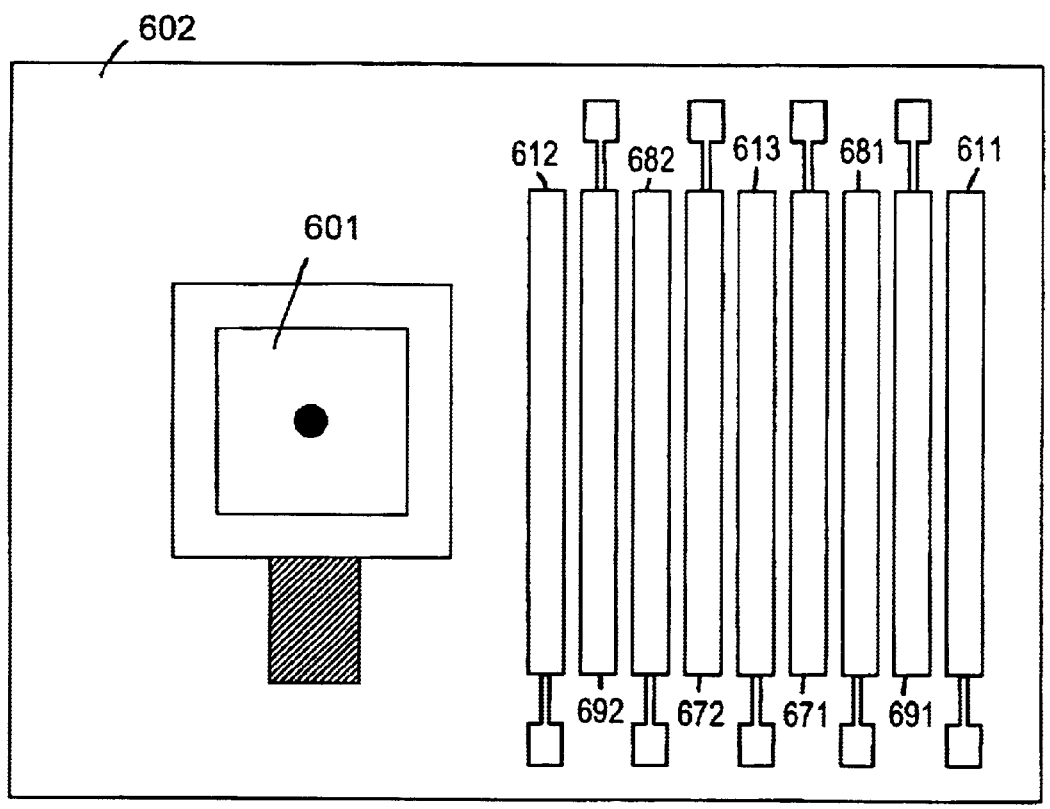
FIG. 6(c) shows the detail of the detector and the laser chip in FIG. 6(a).

In another element of the embodiment shown in FIG. 6(a), there is another grating structure 606 etched on the glass substrate, which is shown in FIG. 6(b). Instead of putting the periodic pattern on the detector elements, it is put on this grating structure, and the beams are diffracted to different detector elements so each detector element receives a phase-shifted version. The sinusoidal shape of the grating is divided into multiple zones. The period of the sinusoidal boundary is related to the grating on the moving medium by $MT_0$ where $M = (Z_2 + Z_0)/Z_0$ and $Z_2$ is the distance between the medium and the top surface of the grating. As shown in FIG. 6(b), there are four zones 607, 608, 609 and 610. In this discussion each zone is separated by 90 degree phase shift from each other. Each zone also contains evenly spaced grating with different periodicity. For example, the gratings in zone 607, 608, 609 and 610 has periods t, t/2, t/3 and t/4 respectively. The purpose of the gratings is to project light incident on each zone to different detectors 671, 672, 681, 682, 691, 692, 611 and 612 as shown in FIG. 6(c).

A central detector 613 collects the undiffracted beam. The central detector is not used, and is there simply because it allows a standard detector structure to be used for the product. The next closest pair of detectors 671 and 672 to the center collect the $\pm 1^{st}$ order diffracted light from zone 607. The next pair of detectors 681 and 682 collect the $\pm 1^{st}$ order diffracted light from zone 608. The detectors 691 and 692 collect the $\pm 1^{st}$ order diffracted light from zone 609. The detectors 611 and 612 collect the $\pm 1^{st}$ order diffracted light from zone 610. The advantage of this embodiment is that the filtering of the motion signal is done by the grating 606, and not by the structure on the detector as in U.S. Pat. No. 5,991,249 or in the previous embodiments discussed in this present invention. This greatly reduces the time required to design a new device with a different grating period on the moving medium. Typically it takes about 3 months to implement a new detector. However, it takes about two weeks to have a new grating fabricated. Variations in the grating are possible. For example, instead of using 4 zones for the grating with 90 degree phase shift, a three zone structure with 120 degree phase shift can also be used.

Figure 6D:
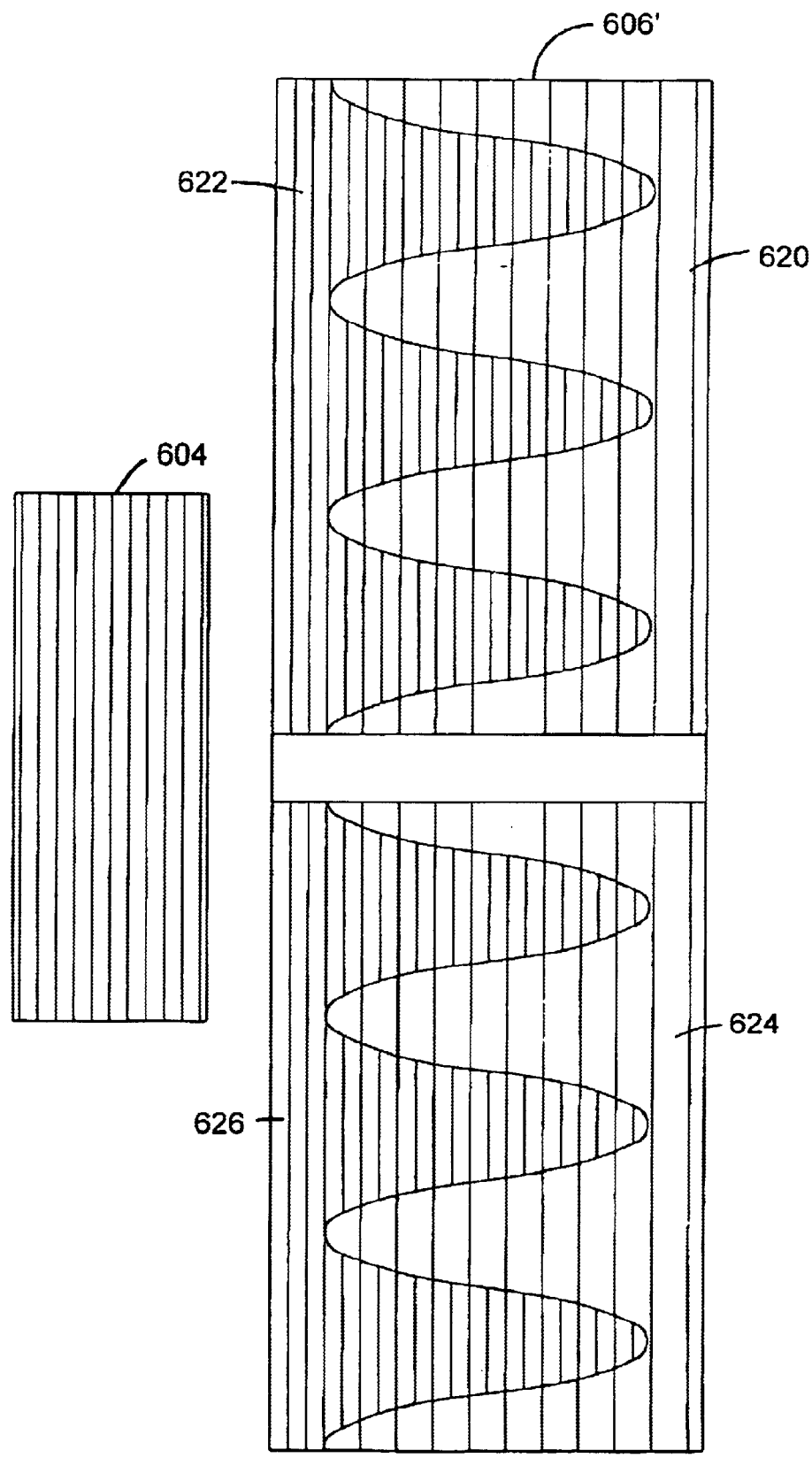
FIG. 6(d) shows another embodiment of the diffractive elements of FIG. 6(b).
Figure 6E:
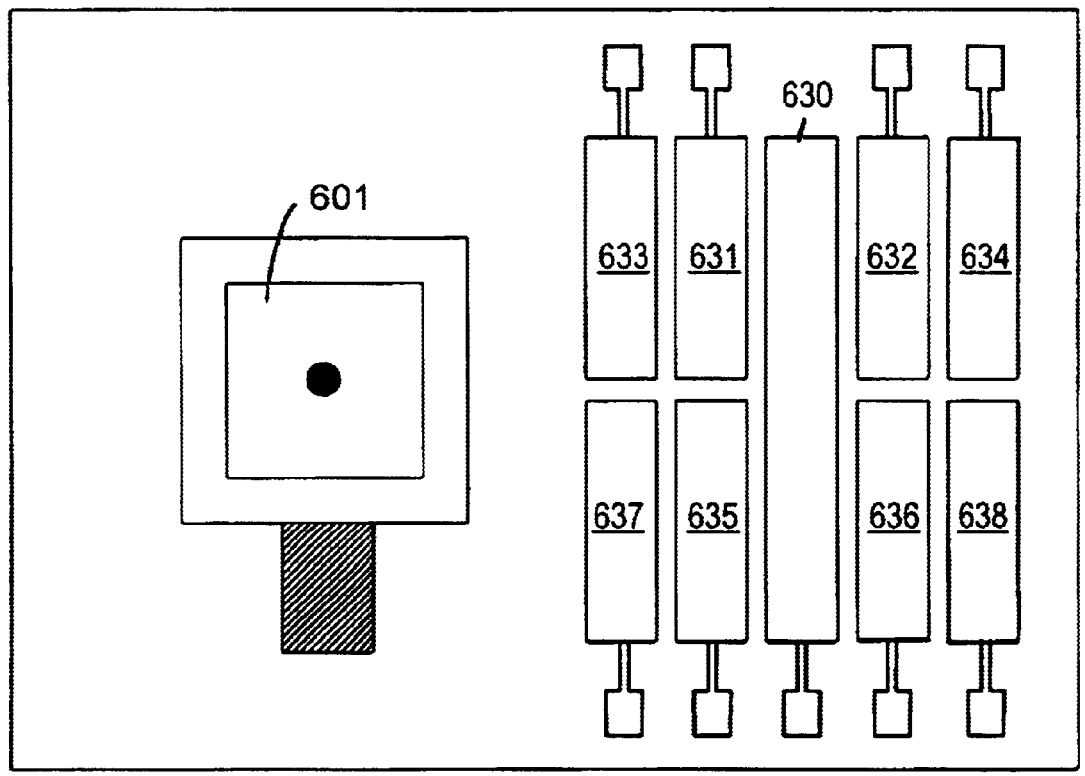
FIG. 6(e) shows another embodiment of a detector structure for use with the embodiment of FIG. 6(d).

FIG. 6(d) shows another embodiment, 606', of the grating 606 of FIG. 6(b). Instead of interleaving the four zones, zones 620 and 622 occupy the top half of the grating, and zones 624 and 626 occupy the lower half of the grating. Each pair of zones is 180 degrees out of phase, and the zone pair 624 and 626 is delayed by a 90 degree phase shift from zones 620 and 622. The light sensitive elements necessary to detect the four quadrature signals are shown in FIG. 6(e). The detector still has nine light sensitive elements similar to the detector in FIG. 6(c). However, there are only two pairs of detectors horizontally, two on top, and two on the bottom. Zone 620 diffracts to detectors 631 and 632, while zone 622 diffracts to detectors 633 and 634. Similarly, on the bottom half, zone 624 diffracts to detectors 635 and 636, while zone 626 diffracts to zones 637 and 638.

There are two advantages in this embodiment. One is that there are only two different periods in the four zones. Secondly, the second order diffraction from the lower frequency grating may leak into the detector 634 and 633. Since the quadrature signals is obtained by taking the difference between the signals from the detector 634 and 631, the crosstalk between the detectors 631 into 634 only reduces the signal modulation by a small amount.

Index Mark Detection

Figure 7A:
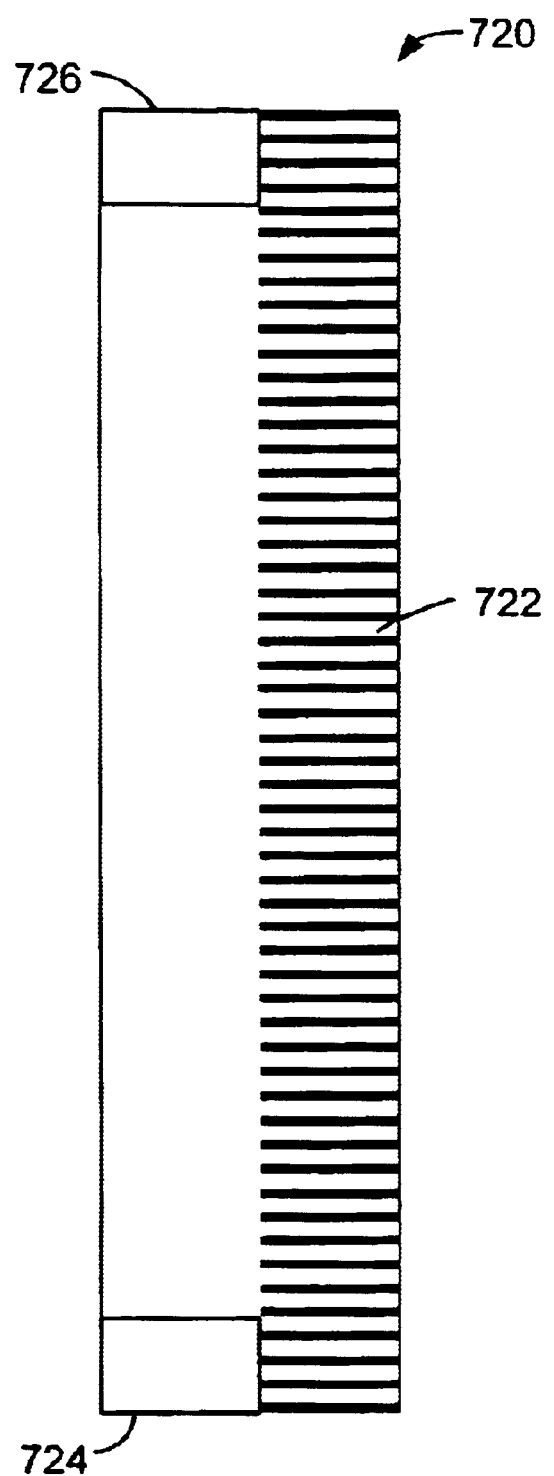
FIG. 7(a) shows a grating with index marking.

FIG. 7(a) shows a portion of a moving medium 720 with a grating 722 having index markings 724, 726 at either end of the grating. The dark area of the index marking indicates metal coating has been applied to the glass. It can be seen that the index mark is a transition from metal coating to no metal coating.

Figure 7B:
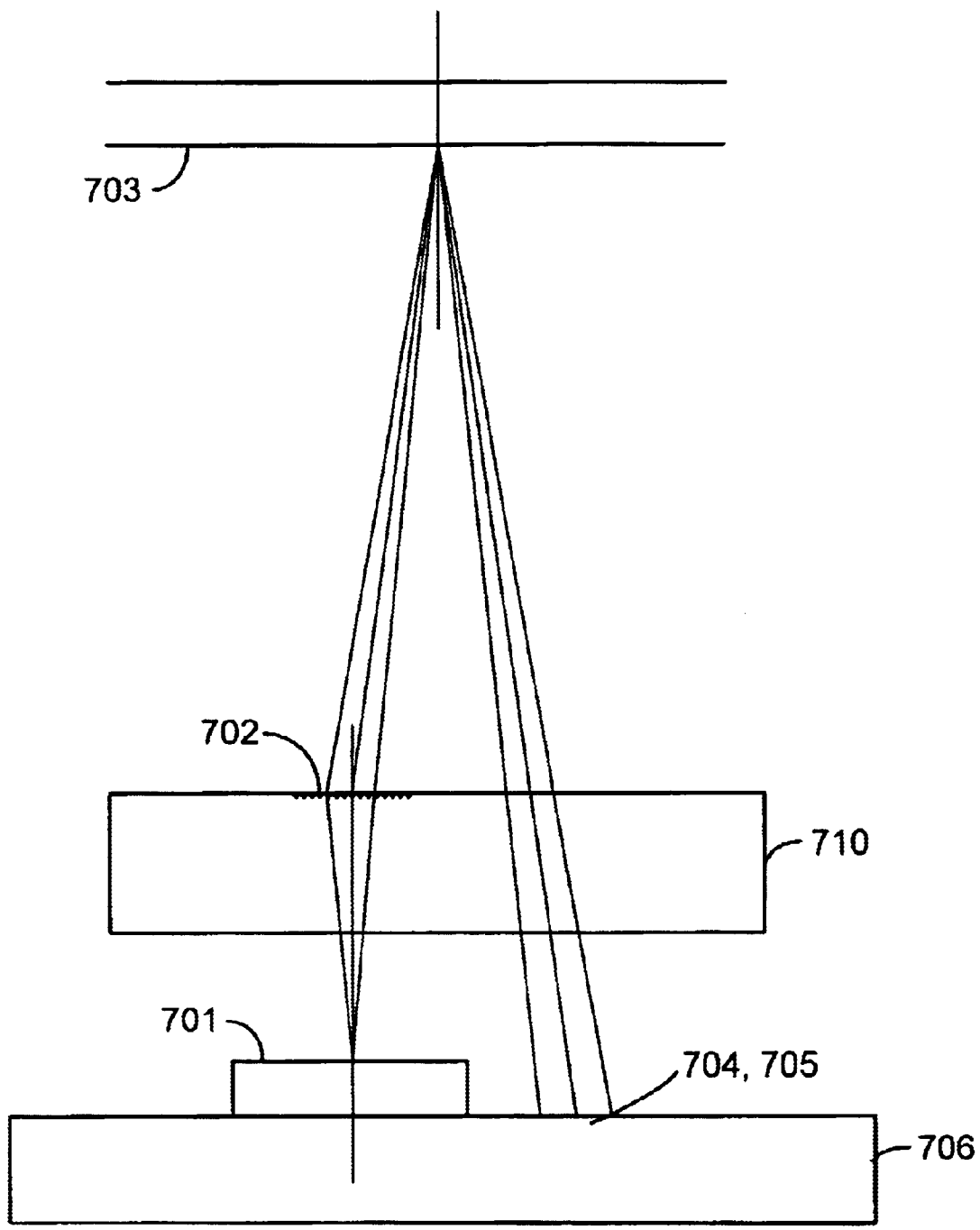
FIG. 7(b) shows a device for detecting the starting position of the grating.

FIG. 7(b) shows how the index marking is detected. Similar to FIG. 4, the light from the laser 701 is incident on a diffractive cylindrical lens 702, formed on a glass element 710, which focuses the light beam to a line slightly behind the grating surface and on the adjacent index marking portion of the grating 703. The light reflected by the index marking falls on a split detector 704, 705, which is part of a detector chip 706.

Figure 7C:
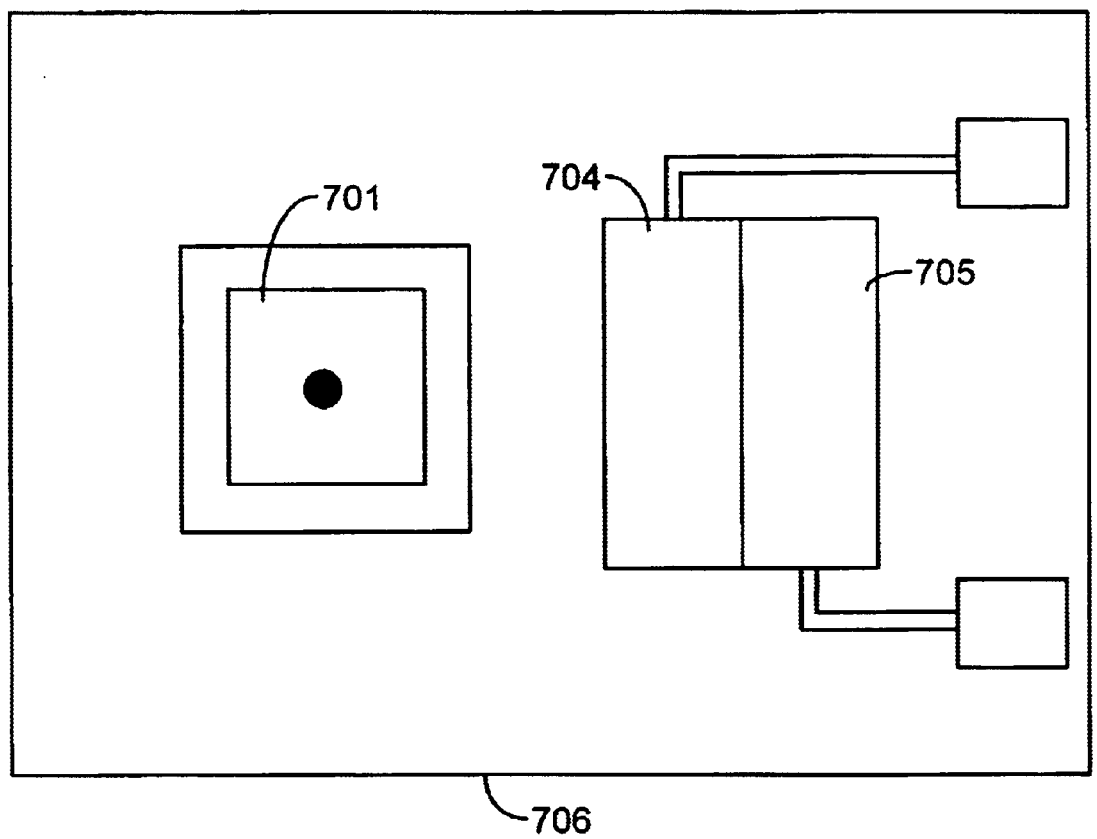
FIG. 7(c) shows the top view of the laser/detector device for use with the embodiment of FIG. 7(a).

FIG. 7(c) shows the top view of the device in FIG. 7(b). A VCSEL laser 701 is mounted on a detector chip 706. Next to the VCSEL are two light sensitive elements 704 and 705.

The difference between the outputs from 704 and 705 constitutes the index signal.

Figure 7D:
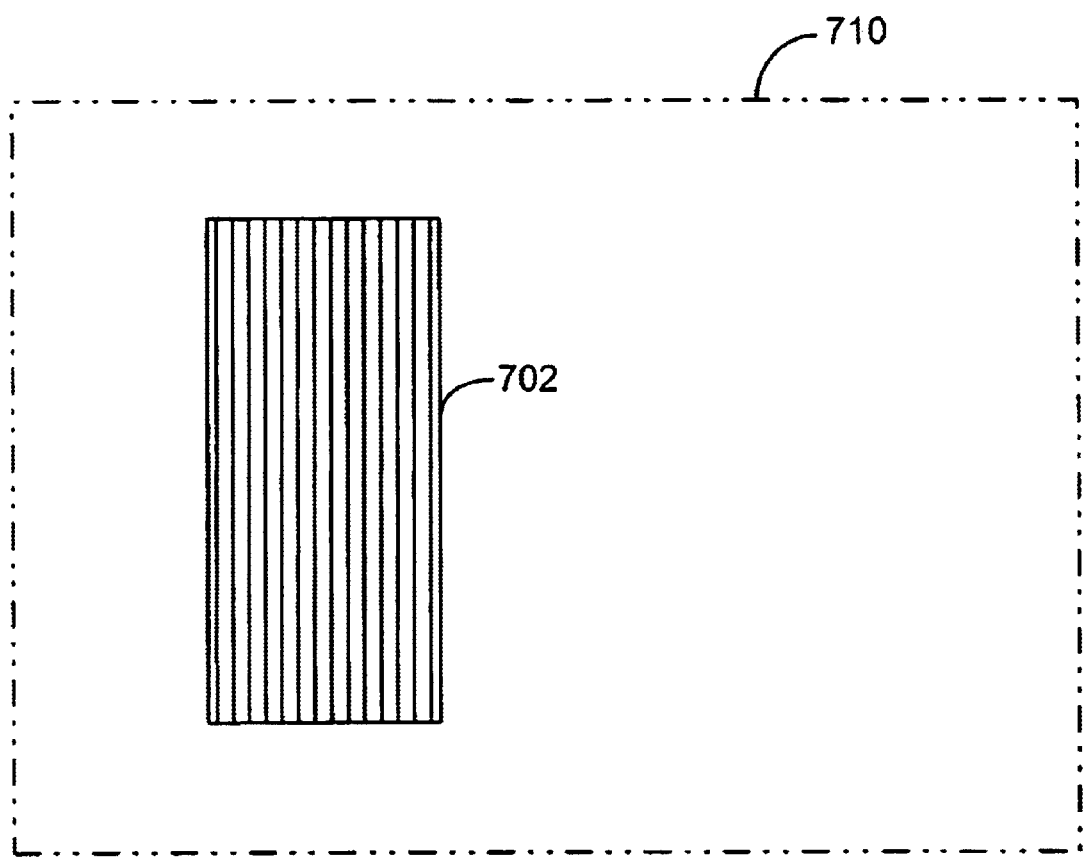
FIG. 7(d) shows an embodiment of a diffractive pattern on the glass cylindrical lens of FIG. 7(a).

FIG. 7(d) shows the glass element 710 of FIG. 7(b) from the top, with the cylindrical diffractive lens element 702.

Figure 8A:
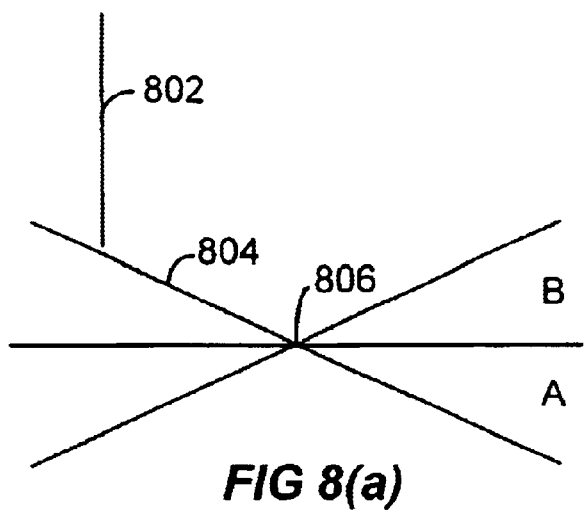
FIG. 8(a)–(c) illustrate how a split detector generates the index signal for the embodiment of FIG. 7(a).
Figure 8B:
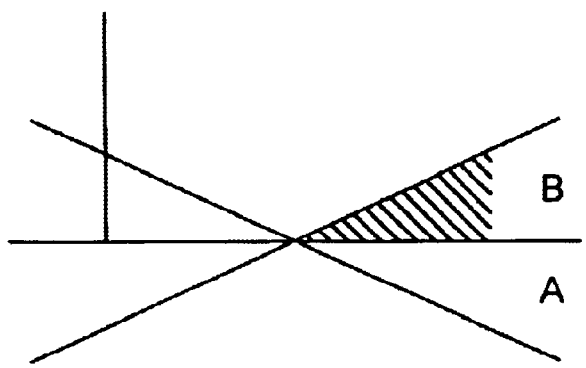
Figure 8C:
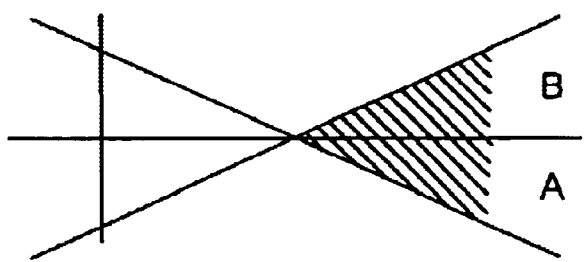

FIGS. 8(a)–8(c) illustrate how the split detector generates the index signal. To simplify the discussion the detector is shown on the right (A, B) behind index marking plane (802) and on the opposite side of the laser (on the left, not shown). Laser beam 804 is shown focused at a point 806 after passing by the index marking plane, then expanding again until it contacts the detectors A, B. This configuration is shown, instead of a reflective configuration, to demonstrate the concept. The concept applies equally well to a reflective configuration, which is simply more complicated to draw.

FIG. 8(a) shows the metal coating area is outside the laser beam. As a result both detector A and detector B are both illuminated. Hence, the difference signal A–B is zero. In FIG. 8(b) the metal coating is blocking half of the laser beam (in a reflective configuration, the metal coating would reflect the beam, and the non-metal would not, reversing the detector signal. Detector A is still illuminated. However, the metal coating is obstructing the light from reaching detector B. Therefore, A–B>0.

Finally, in FIG. 8(c) the metal coating filly blocks the light from reaching detector A and B. Once again, A–B=0.

Figure 8D:
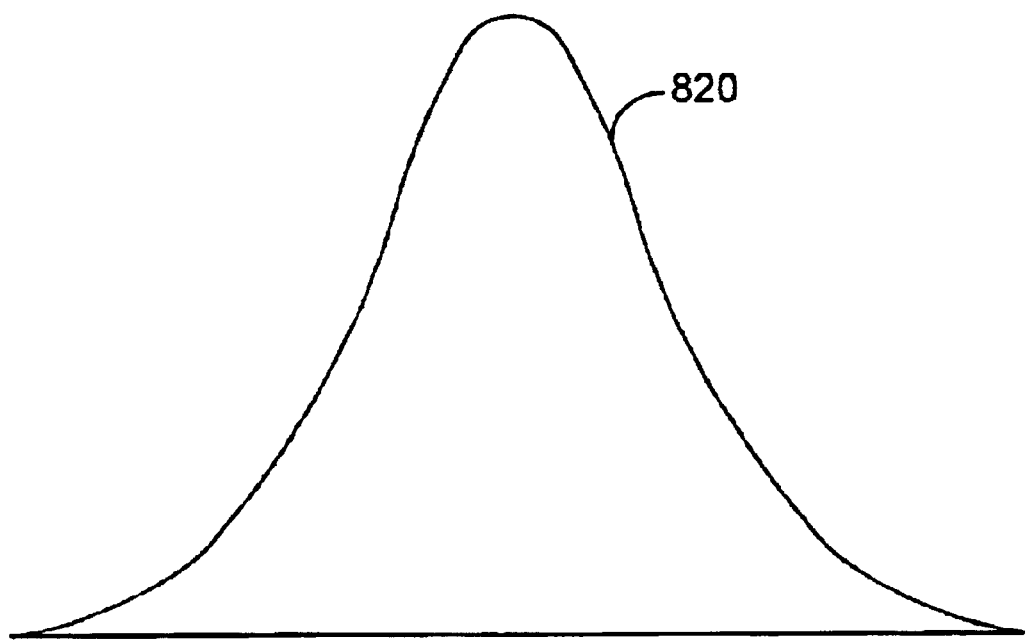
FIG. 8(d) illustrates the signal generated for the example of FIGS. 8(a)–(c).

The signal 820 generated by A–B is shown in FIG. 8(d). The signal increases, then decreases as the metal coating, indicating an index marking, passes in front of the detectors. A similar explanation can be applied to the situation where the detector is placed on the same side as the laser.

Combined Index and Grating Detector

Figure 9A:
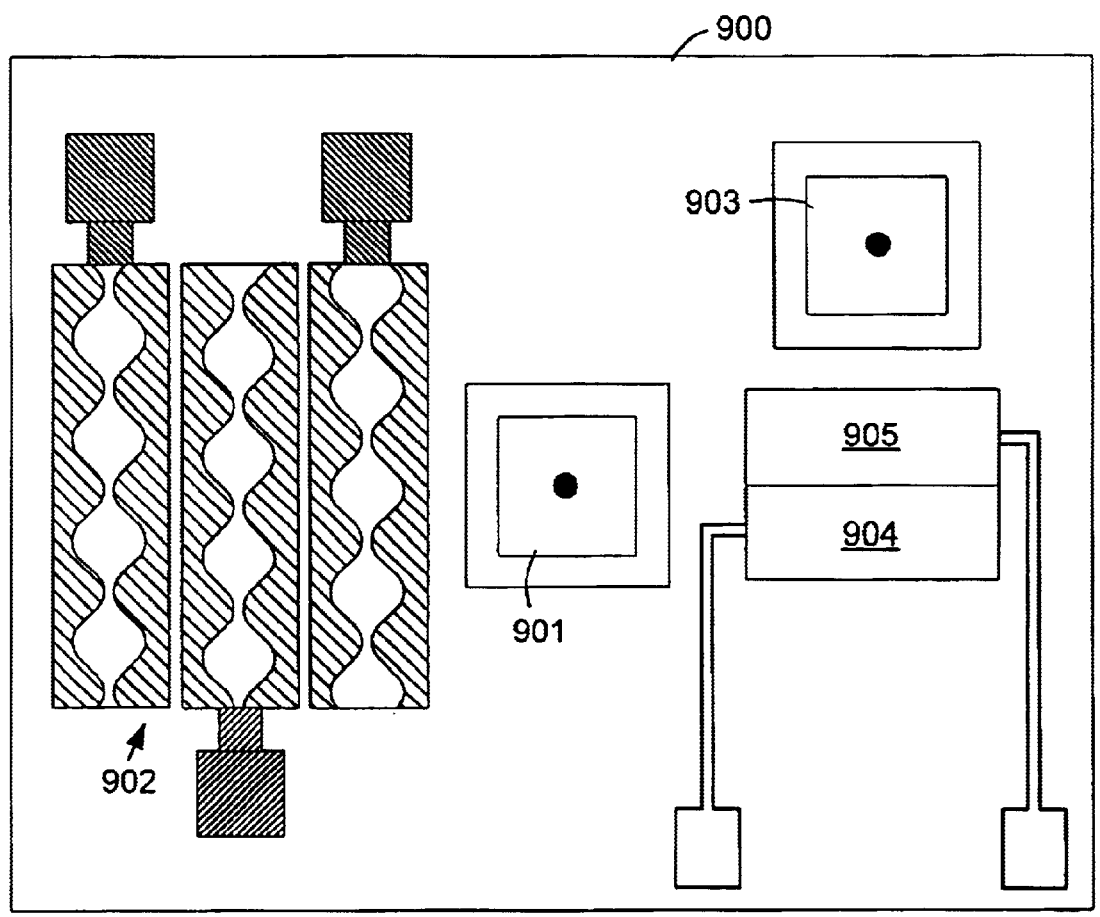
FIG. 9(a) shows an integrated device for detecting the index mark and the grating motion.
Figure 9B:
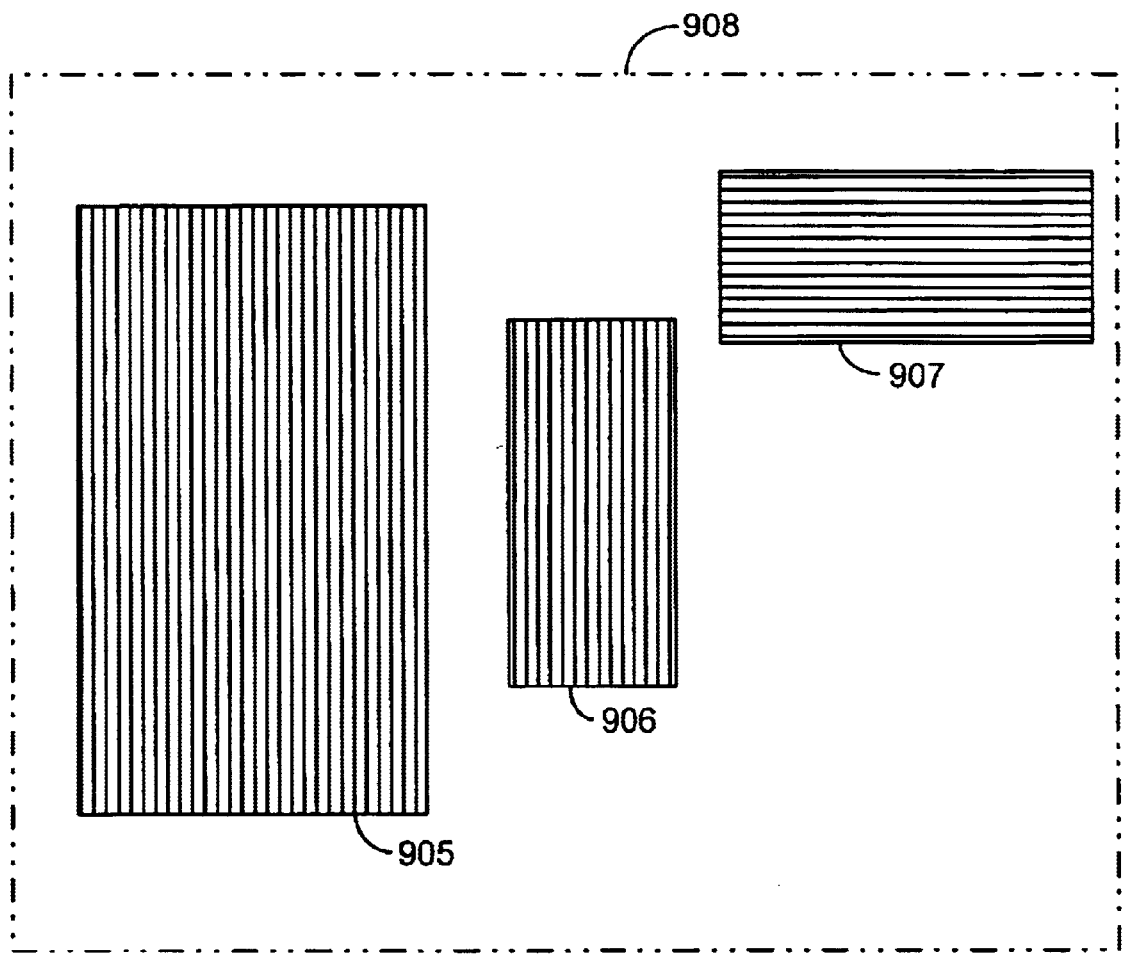
FIG. 9(b) shows the diffractive element on top of the device in FIG. 9(a)

FIG. 9(a) shows the top view of another embodiment of the present invention which detects both the index mark and the position of the grating on a moving medium. In FIG. 9(a) laser chips 901 and 903 are bonded on top of detector chip 900. A glass element 908 with diffractive elements 905, 906 and 907 shown in FIG. 9(b) is placed on top of the detector device in the same manner as in FIG. 7(b). Diffractive element 906 is a cylindrical diffractive lens like lens 504 of FIG. 5(b), and focuses the laser beam from laser chip 901 to a line parallel to the line separating detector 904 and 905. That line is then reflected off the medium onto diffractive element 905, which spreads the reflected beam over three element detector 902 to detect the position of the grating (similar to diffractive element 506 of FIG. 5(b)).

Diffractive element 907 focuses the laser beam from laser 903 into a line parallel to the sinusoidal detectors 902. The reflected beam, used to detect the index marking, impacts two element detectors 904 and 905. Laser chip 903 is placed a distance from laser chip 001 corresponding to the distance on the media between the grating structure and the index marking. If the grating is arranged in rows, with index markings for each one, the index marking detected could be one several rows over to allow a practical placement of the laser chips and detectors.

Two Dimensional Grating Detection

Figure 10A:
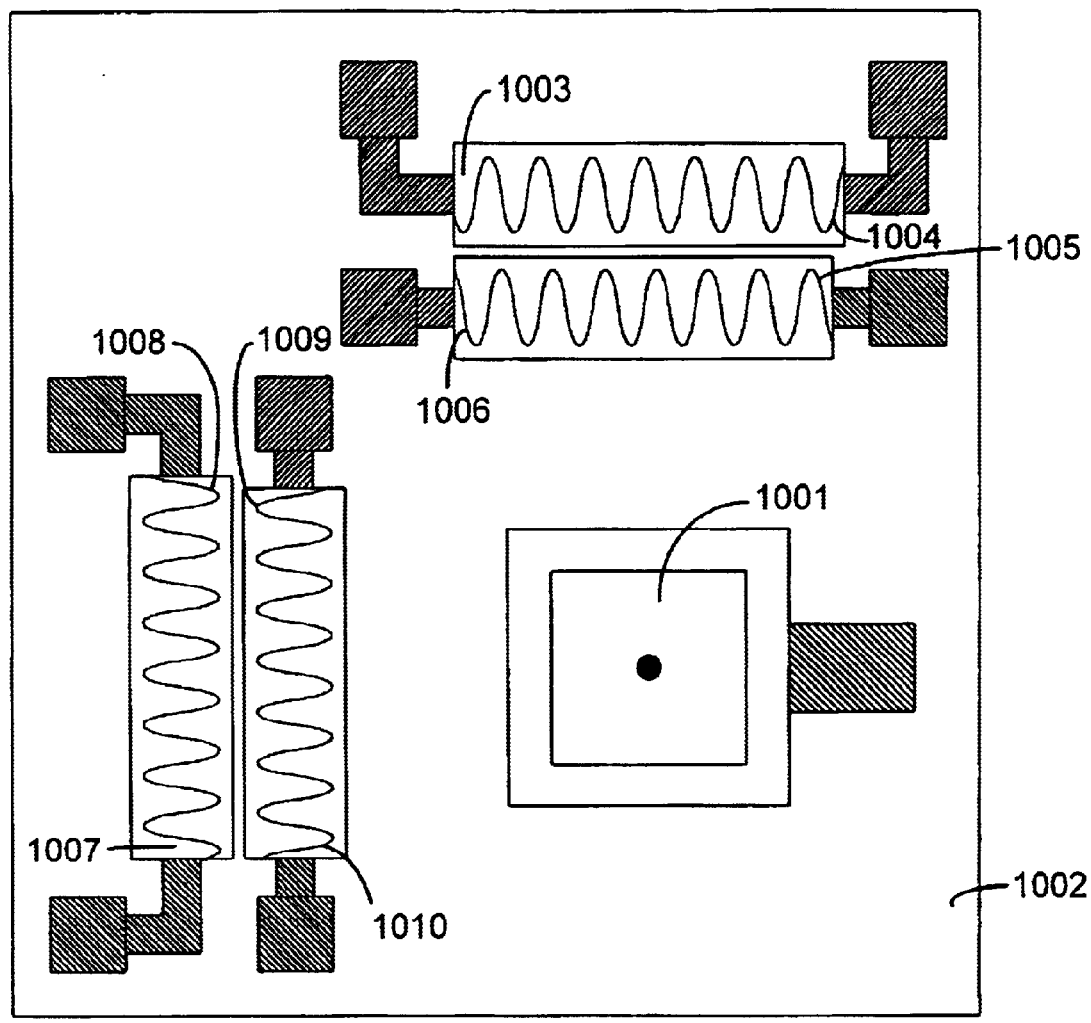
FIG. 10(a) shows a two-dimensional grating motion detecting device.

The top view of another embodiment of this present invention is shown in FIG. 10(a). A VCSEL laser 1001 is mounted on a detector chip 1002. The detector chip has two separate light detection areas. Light detection areas 1003, 1004, 1005 and 1006 are used to detect the motion of the moving grating in one axis. Light detection areas 1007, 1008, 1009 and 1010 are used to detect the motion of the moving grating in along an axis perpendicular to the first axis.

Figure 10B:
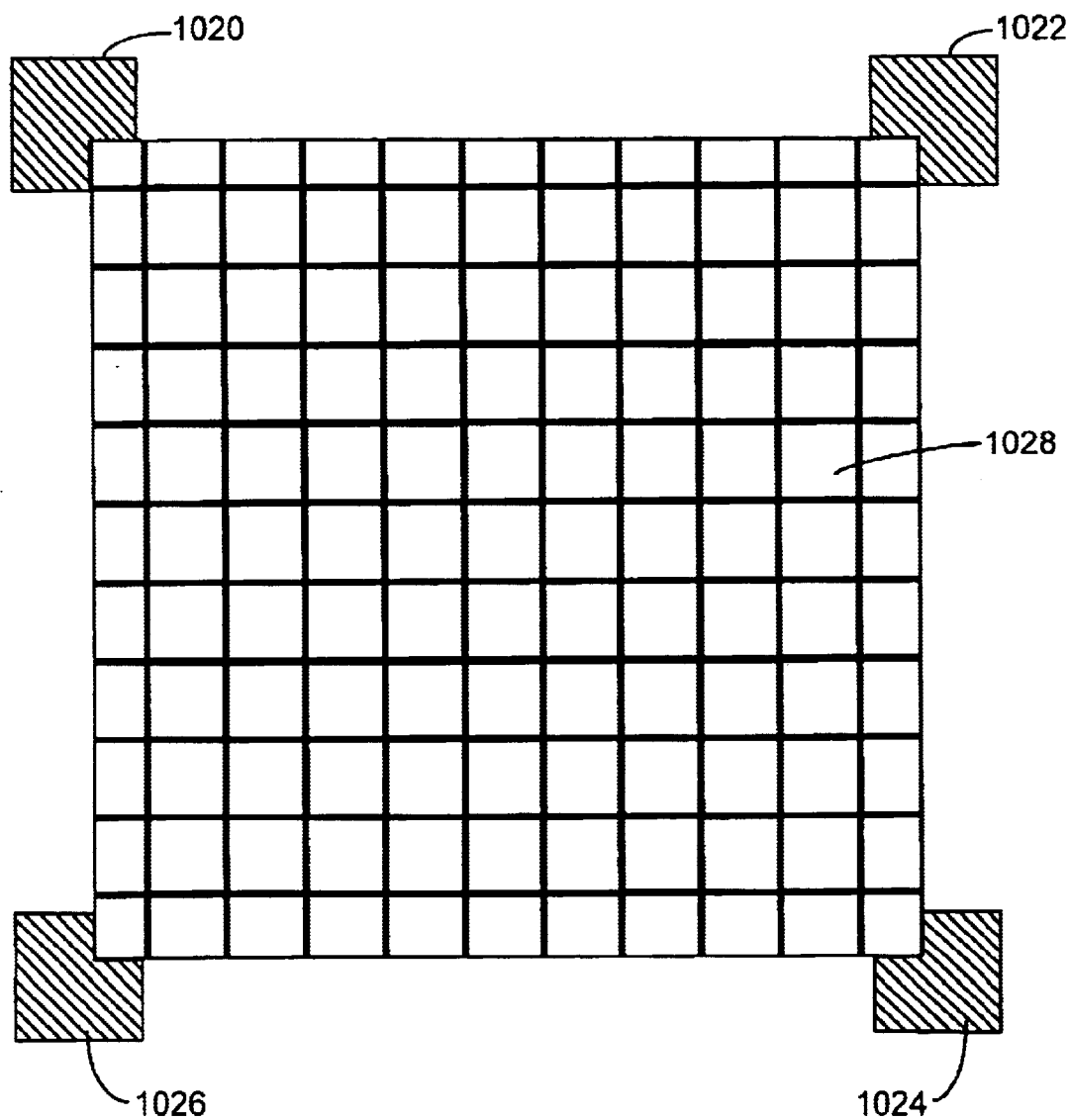
FIG. 10(b) shows a two-dimensional grating with corner markings.

FIG. 10(b) shows the structure of the two-dimensional grating is shown in FIG. 10(b). The dark corners 1020, 1022, 1024 and 1026 are the index markings for the grating 1028. The detectors 1003, 1004, 1005 and 1006 all have proper sinusoidal patterns to detect the motion of the grating in the right and left direction. Detectors 1007, 1008, 1009 and 1010 detect movement of the grating in the up and down (on the figure) direction.

Additional Grating to Eliminate Effect of Modulation Along Other Axis

Figure 10C:
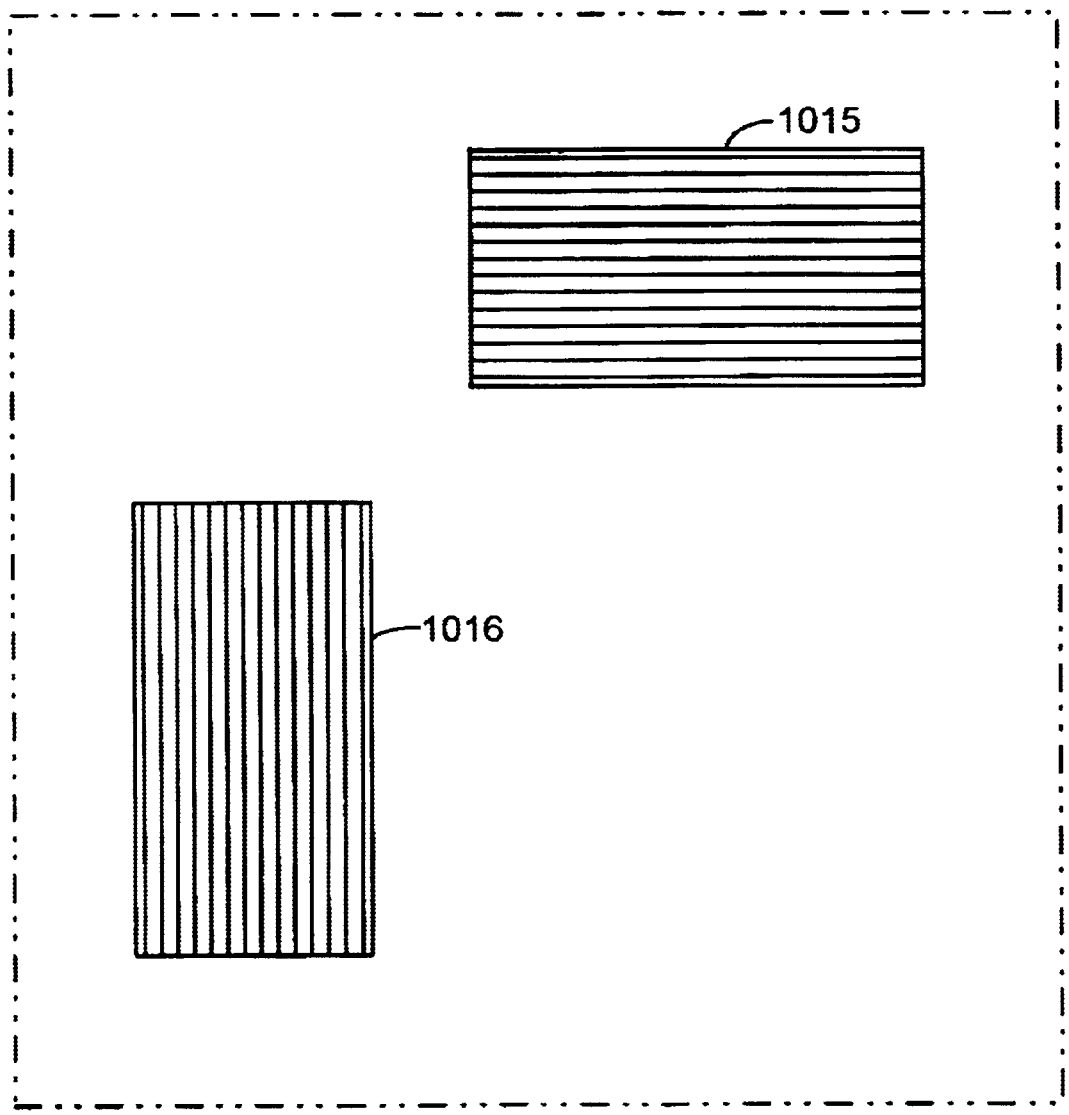
FIG. 10(c) shows the diffractive element on top of the device in FIG. 10(a)

When the reflection from the grating on the moving medium moves in the up and down direction, it is necessary that the signal produced by light sensitive areas 1003, 1004, 1005 and 1006 remain constant. A regular phase grating 1015 (see FIG. 10(c)) is placed on top of the detectors 1003, 1004, 1005 and 1006. This grating 1015 will smooth out the light fluctuation so that the output signal from detectors 1003, 1004, 1005 and 1006 are not sensitive to up and down motion and is only sensitive to left and right motion. In a similar fashion a grating 1016 is placed on top of the detectors 1007, 1008, 1009 and 1010 will render the detectors 1007, 1008, 1009 and 1010 less sensitive to the left and right motion of the grating.

Figure 11A:
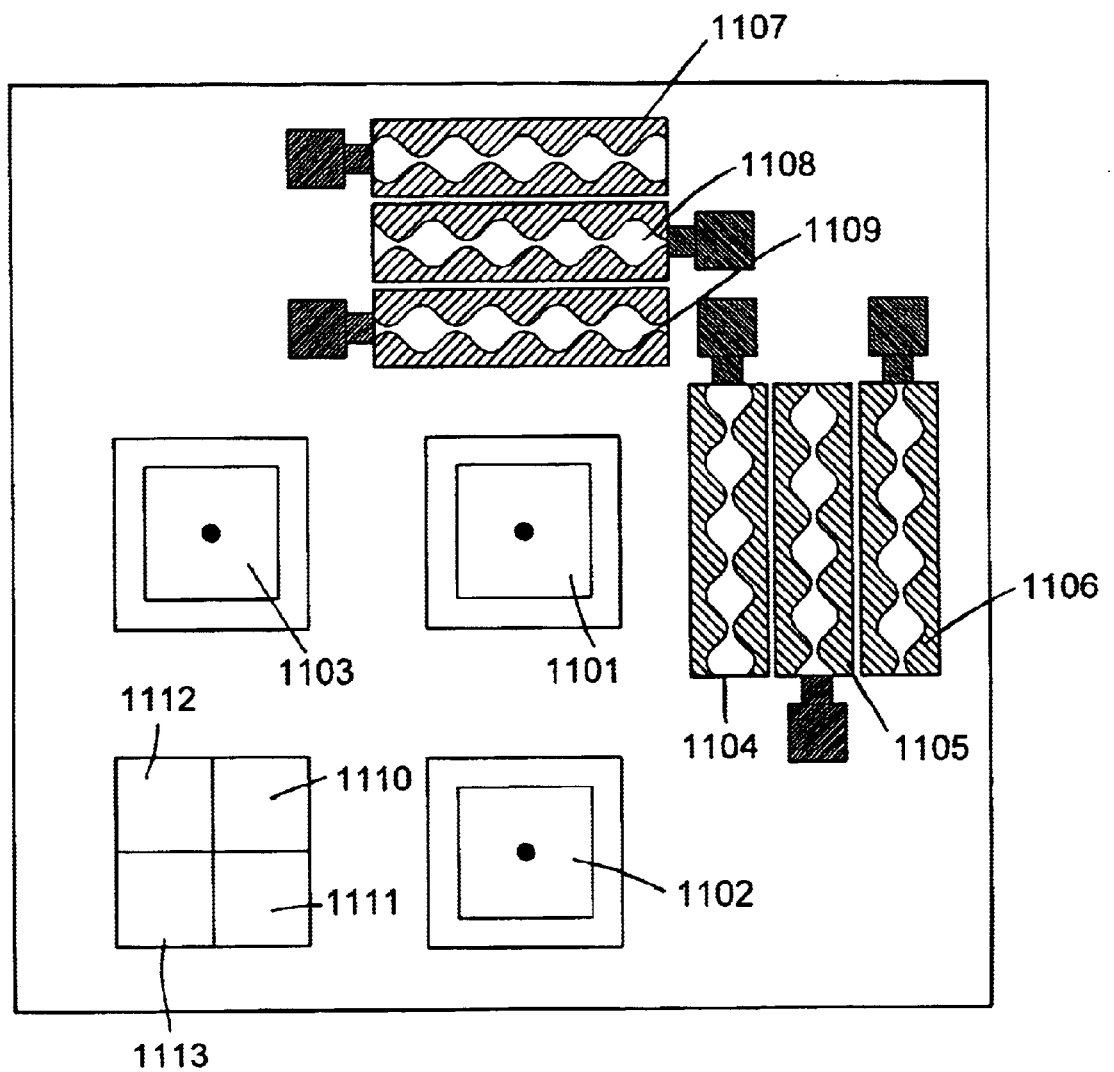
FIG. 11(a) shows a modification of the device in FIG. 10(a) for detecting the motion of the two-dimensional grating and the index marking on the grating.

FIG. 11(a) shows another embodiment of this present invention. This device combines two of the devices of FIG. 7 and one device of FIG. 10 in order to detect the indeces along two axes and the motion of the two-dimensional gratings. A laser 1101 illuminates the two-dimensional grating for motion detection. Detectors 1104, 1105 and 1106 generate a motion signal in the first axis of the grating. Detectors 1107, 1108, and 1109 generate a motion signal in the second axis perpendicular to the first axis.

Lasers 1102 and 1103 in combination with the quadrant detector 1110, 1111, 1112 and 1113 generate the index signals.

Figure 11B:
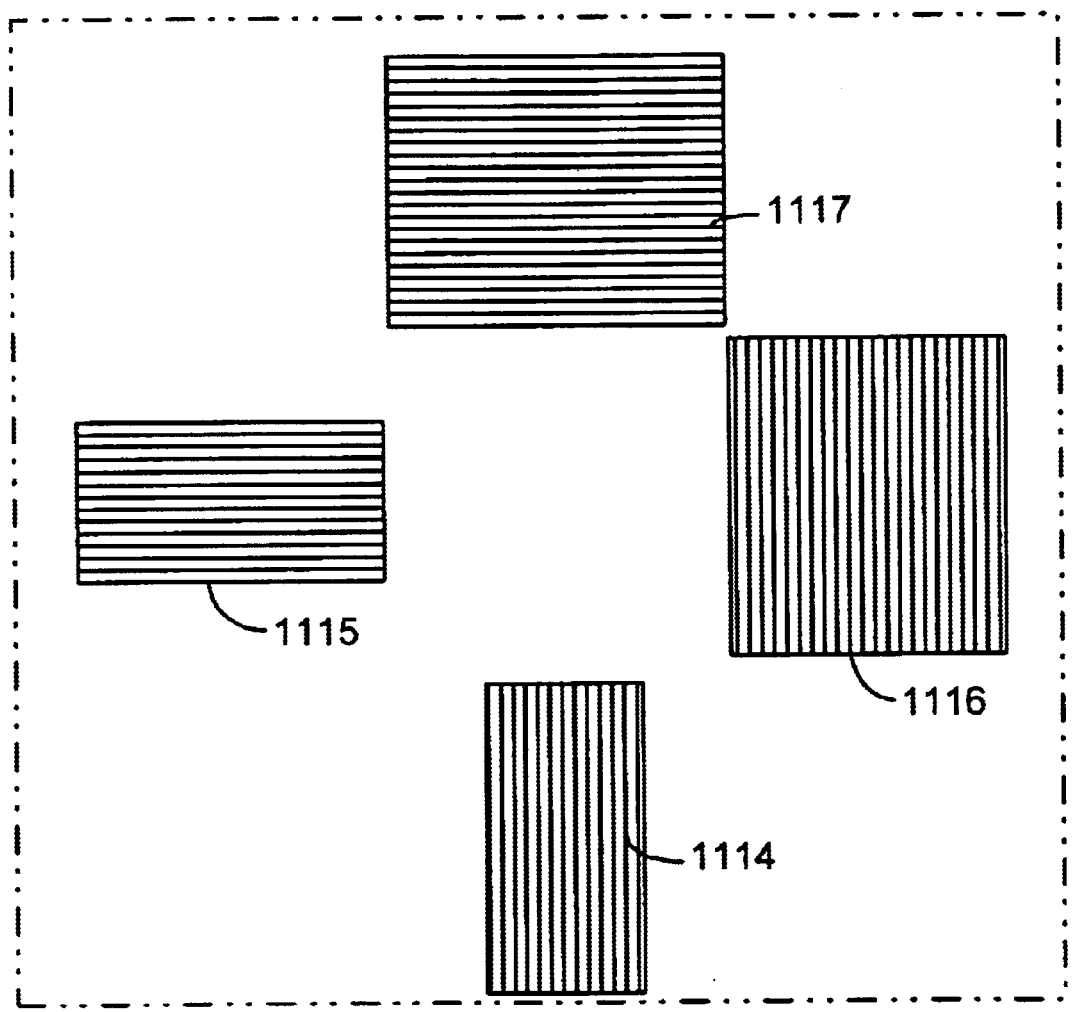
FIG. 11(b) shows the diffractive elements on top of the device in FIG. 11(a).

FIG. 11(b) shows a pair of cylindrical lens, 1114 and 1115, which focus the laser beams from lasers 1102 and 1103 to a line on the grating surface as discussed in the device described in FIG. 7.

As will be understood by those of skill in the art, the present invention may be embodied in other specific forms without departing from the essential characteristics thereof. For example, the medium could be stationary, and the sensor could be moving, or vice-versa. Accordingly, the foregoing description is intended to be illustrative, but not limiting, of the scope of the invention which is set forth in the following claims.

What is claimed is:

1. A device for detecting the position of a moving medium having a periodic pattern, comprising:
    a light source mounted to direct a beam of light at said medium;
    a multiple element detector mounted to intercept a reflected beam of light from said medium, wherein said reflected beam of light diverges from said light source to said medium and from said medium to said detector; and
    a periodic structure for varying the area of said detector exposed to said reflected beam of light along a first axis, the period of said periodic structure corresponding to a harmonic of a frequency of said periodic pattern of said medium.

2. The device of claim 1 wherein said detector is mounted at a plane other than the self image plane of an image from said periodic pattern on said medium and without optical components between said light source and said detector.

3. The device of claim 1 further comprising a diffraction grating mounted between said medium and said detector for directing said reflected light to said detector.

4. The device of claim 3 wherein said periodic structure is mounted on said diffraction grating, and wherein different zones of said periodic structure have different periods of said diffraction grating to diffract said reflected light to different elements of said detector.

5. The device of claim 1 wherein said detector comprises three light sensitive elements having either 120 degree phase difference or 90 degree phase difference in the detector pattern for providing differential detector signals.

6. The device of claim 1 further comprising a diffractive element mounted between said light source and said medium to focus said beam of light to form a line image on said medium.

7. The device of claim 1 further comprising:
    a second light source mounted to direct a second beam of light at said medium at a position on said medium corresponding to index markings on said medium;
    a two element photodetector mounted to receive a reflection of said second beam of light.

8. The device of claim 1 further comprising:
    a second multiple element detector mounted to intercept a reflected beam of light from said medium; and
    a second periodic structure for varying the area of said second multiple element detector exposed to said reflected beam of light along a second axis, the period of said periodic structure corresponding to a harmonic of a frequency of said periodic pattern of said medium corresponding to said second axis;
    whereby said device detects periodic patterns on said medium corresponding to said first and second axes.

9. The device of claim 1 where in said periodic structure on said medium consists of marks and spaces having different dimensions.

10. The device of claim 6 wherein the diffractive lens is a cylindrical lens.

11. The device of claim 6 wherein the detector is a split detector.

12. A device for detecting the position of a medium having a periodic pattern, comprising:
    a light source mounted to direct a beam of light at said medium;
    a multiple element detector mounted to intercept a reflected beam of light from said medium, wherein said reflected beam of light diverges from said light source to said medium and from said medium to said detector;
    a periodic structure for varying the area of said detector exposed to said beam of light over at least a first element of said multiple element detector, a period of said periodic structure given by $MT_0/n$, where $M=(Z_1+Z_0)/Z_0$ is a magnification factor determined by the distance $Z_0$ between said light source and said medium and the distance $Z_1$ between the detector and the medium, $T_0$ is the period of the periodic pattern on the medium and n is an integer number, the period of said periodic structure corresponding to a harmonic of a frequency of said periodic pattern of said medium;
    a diffraction grating mounted between said medium and said detector for directing said reflected light to said detector;
    wherein said periodic structure is mounted on said diffraction grating, and wherein different zones of said periodic structure have different periods of said diffraction grating to diffract said reflected light to different elements of said detector; and
    wherein said detector comprises three light sensitive elements having either 120degree phase difference or 90 degree phase difference in the detector pattern for providing differential detector signals.

13. A device for detecting the position of a medium having a periodic pattern, comprising:
   a detector;
   a laser mounted adjacent said detector;
   a diffractive lens mounted between said laser and said medium to form a line image on said medium, said line being normal to said periodic pattern.

14. A device for detecting the position of a medium having a periodic pattern, comprising:
   a multiple element detector;
   a laser mounted adjacent said detector;
   a first diffractive lens mounted between said laser and said medium to form a line image on said medium, said line being normal to said periodic pattern; and
   a second diffractive lens mounted between said medium and said detector to direct a reflection of said laser beam to different elements of said detector.

15. The device of claim 14 further comprising:
   a periodic structure for varying the area of said second diffractive lens exposed to said beam of light, a period of said periodic structure given by $MT_0/n$, where $M=(Z_1+Z_0)/Z_0$ is a magnification factor determined by the distance $Z_0$ between said light source and said medium and the distance $Z_1$ between the second diffractive grating and the medium, $T_0$ is the period of the periodic pattern on the medium and n is an integer number, the period of said periodic structure corresponding to a harmonic of a frequency of said periodic pattern of said medium.

16. The device of claim 15 wherein the first diffractive grating has the function of a cylindrical lens, which focuses an incident beam from the laser to the detector plane, rather than to the medium.

17. The device of claim 15 wherein the second diffractive element includes a plurality of zones, each zone corresponding to a different one of said elements of said detector, each zone having a diffractive gratings with a different spatial frequency such that light incident on each zone diffracts the incident light to a corresponding detector element, said zones being arranged so that the signals provided to said detector elements have a relative phase shift with respect to each other.

18. A device for detecting the position of said device with respect to a medium having a periodic pattern which is periodic in two directions, comprising:
   a light source mounted to direct a beam of light at said moving medium;
   first and second detectors mounted to intercept a reflected beam of light from said medium, wherein said reflected beam of light diverges from said light source to said medium and from said medium to said detectors;
   a first periodic structure for varying the area of said first detector exposed to said reflected beam of light along a first axis, the period of said periodic structure corresponding to a frequency of said periodic pattern in a first direction; and
   a second periodic structure for varying the area of said second detector exposed to said reflected beam of light along a second axis, the period of said periodic structure corresponding to a frequency of said periodic pattern in a second direction.

19. The device of claim 18 wherein said periodic structures are sinusoidal and are oriented perpendicular to each other.

20. The device of claim 18 wherein said periodic patterns are sinusoidal and have a period determined by $MT_0/n$, where $M=(Z_1+Z_0)/Z_0$ is a magnification factor determined by the separation $Z_0$ between the laser and the periodic pattern on the moving medium and the separation $Z_1$ between the detector and the periodic pattern, $T_0$ is the period of the periodic pattern on the medium and n is an integer number.

21. The device of claim 18 further comprising a first diffractive grating mounted to reduce the impact of said periodic pattern along said second axis on said first detector, and a second diffractive grating mounted to reduce the impact of said periodic pattern along said first axis on said second detector.

22. The device of claim 18 further comprising a light sensitive area for detecting the index marking divided into four segments.

23. The device of claim 12 further comprising:
   second and third light sources for detecting index markings on the corners of portions of the periodic pattern on the medium.

24. The device of claim 23 further comprising:
   a first diffractive cylindrical lens mounted between said second light sources and said medium.

25. The device of claim 18 further comprising a second diffractive cylindrical lens mounted between said third light source and said medium.

* * * * *